US011057871B2

(12) United States Patent
Huang et al.

(10) Patent No.: US 11,057,871 B2
(45) Date of Patent: Jul. 6, 2021

(54) FREQUENCY HOPPING IN AN UPLINK CONTROL CHANNEL

(71) Applicant: QUALCOMM Incorporated, San Diego, CA (US)

(72) Inventors: Yi Huang, San Diego, CA (US); Wanshi Chen, San Diego, CA (US); Juan Montojo, San Diego, CA (US); Peter Gaal, San Diego, CA (US); Tao Luo, San Diego, CA (US); Renqiu Wang, San Diego, CA (US); Seyong Park, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 77 days.

(21) Appl. No.: 16/045,535

(22) Filed: Jul. 25, 2018

(65) Prior Publication Data

US 2019/0045498 A1   Feb. 7, 2019

Related U.S. Application Data

(60) Provisional application No. 62/538,544, filed on Jul. 28, 2017.

(51) Int. Cl.
*H04W 72/04* (2009.01)
*H04B 1/713* (2011.01)
(Continued)

(52) U.S. Cl.
CPC ........ *H04W 72/0413* (2013.01); *H04B 1/713* (2013.01); *H04L 5/0048* (2013.01);
(Continued)

(58) Field of Classification Search
None
See application file for complete search history.

(56) References Cited

U.S. PATENT DOCUMENTS

2011/0141928 A1* 6/2011 Shin .................. H04L 5/0053
370/252
2017/0367046 A1* 12/2017 Papasakellariou .... H04L 5/0048
(Continued)

FOREIGN PATENT DOCUMENTS

CN        101442338 A        5/2009
CN        102014468 A        4/2011

OTHER PUBLICATIONS

Huawei Hisilicon Vivo NTT DOCOMO OPPO: "WF on Long PUCCH Hopping Design," 3GPP Draft, R1-1709748 WF on Long PUCCH Hopping Design, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-2017051919 May 2017 (May 19, 2017), 4 Pages, XP051285507, Retrieved from the Internet:URL:http://www.3gpp.org/ftp/tsg_ran/WG1_RL1/TSGR1_89/Docs/ [retrieved on May 19, 2017].
(Continued)

*Primary Examiner* — Lonnie V Sweet
(74) *Attorney, Agent, or Firm* — Kevin M. Donnelly

(57) ABSTRACT

Methods, systems, and devices are described for wireless communications. A wireless device may receive an allocation of uplink resources for an uplink transmission of uplink control information (UCI) during a long physical uplink control channel (PUCCH), which may range from four to fourteen symbol periods in length. The wireless device may identify a frequency hopping location based on the length of the PUCCH and a number of bits used to represent the UCI. In some cases, the frequency hopping location partitions the long PUCCH into a first set of symbol periods and a second set of symbol periods. After identifying the frequency hopping location, the wireless device may transmit a UCI message, which may include information and reference symbols, over a first frequency bandwidth during the first set
(Continued)

of symbol periods and over a second frequency bandwidth during the second set of symbol periods.

61 Claims, 18 Drawing Sheets

(51) Int. Cl.
  *H04L 5/00* (2006.01)
  *H04W 72/08* (2009.01)
  *H04L 1/00* (2006.01)
(52) U.S. Cl.
  CPC ....... *H04L 5/0053* (2013.01); *H04W 72/0453* (2013.01); *H04W 72/082* (2013.01); *H04W 72/085* (2013.01); *H04L 1/0073* (2013.01)

(56) References Cited

U.S. PATENT DOCUMENTS

2019/0222254 A1* 7/2019 Kim ..................... H04L 5/1469
2020/0059924 A1* 2/2020 Matsumura ......... H04L 27/2607

OTHER PUBLICATIONS

International Search Report and Written Opinion—PCT/US2018/043903—ISA/EPO—dated Nov. 9, 2018.
LG Electronics: "Design of long NR-PUCCH for more than 2 UCI Bits," 3GPP Draft, R1-1710316 Design of Long NR-PUCCH for more than 2 UCI Bits_Final, 3rd Generation Partnership Project (3GPP), Mobile Competence Centre, 650, Route Des Lucioles, F-06921 Sophia-Antipolis, vol. RAN WG1, No. Qingdao, P.R. China, Jun. 27, 2017-Jun. 30, 2017 Jun. 17, 2017 (Jun. 17, 2017), XP051304947, 7 Pages, Retrieved from the Internet:URL:http://www.3gpp.org/ftp/tsg_ran/WG1_RL1/TSGR1_AH/N_R_AH_1706/Docs/ [retrieved on Jun. 17, 2017].
LG Electronics: "Design of Long NR-PUCCH for up to 2 UCI Bits," 3GPP Draft, R1-1710315 Design of Long NR-PUCCH for up to 2 UCI Bits_Final, 3rd Generation Partnership Project (3GPP), Mobile Competence Centre, 650, Route Des Lucioles, F-06921 Sophia-Antipolis Cedex, vol. RAN WG1, No. Qingdao, P.R. China, Jun. 27, 2017-Jun. 30, 2017 17 Jun. 2017 (Jun. 17, 2017), XP051304946, 7 Pages, Retrieved from the Internet:URL: http://www.3gpp.org/ftp/tsg_ran/WG1_RL1/TSGR1_AH/NR_AH_1706/Docs/ [retrieved on Jun. 17, 2017].
NTT DOCOMO et al., "Long-PUCCH for UCI of more than 2 Bits," 3GPP Draft, R1-1711101, 3rd Generation Partnership Project (3GPP), Mobile Competence Centre, 650, Route Des Lucioles, F-06921 Sophia-Antipolis Cedex, France vol. RAN WG1, No. Qingdao, P.R. China, Jun. 27, 2017-Jun. 30, 2017 Jun. 17, 2017 (Jun. 17, 2017), XP051305391, pp. 1-5, Retrieved from the Internet:URL: http://www.3gpp.org/ftp/tsg_ran/WG1_RL1/TSGR1_AH/NR_AH_1706/Docs/[retrieved on—Jun. 17, 2017].
NTT DOCOMO et al., "Long-PUCCH for UCI of up to 2 Bits," 3GPP Draft, R1-1711100, 3rd Generation Partnership Project (3GPP). Mobile Competence Centre ; 650, Route Des Lucioles ; F-06921 Sophia-Antipolis Cedex, France, vol. RAN WG1. No. Qingdao, P.R. China; Jun. 27, 2017-Jun. 30, 2017 Jun. 17, 2017 (Jun. 17, 2017). XP051305390, pp. 1-7, Retrieved from the Internet:URL: http://www.3gpp.org/ftp/tsg_ran/WG1_RL1/TSGR1_AH/NR_AH_1706/Docs/[retrieved on—Jun. 17, 2017].
Qualcomm Incorporated: "Long PUCCH Design with 1 or 2 Bits UCI Payload," 3GPP Draft, R1-1713432 Long PUCCH Design with 1 or 2 Bits UCI Payload, 3rd Generation Partnership Project (3GPP), Mobile Competence Centre, 650, Route Des Lucioles, F-06921 Sophia-Antipolis Cedex, vol. RAN WG1, No. Prague, Czech Republic, Aug. 21, 2017-Aug. 25, 2017 Aug. 20, 2017 (Aug. 20, 2017), XP051316234, pp. 1-7, Retrieved from the Internet: URL:http://www.3gpp.org/ftp/Meetings_3GPP_SYNC/RAN1/Docs/ [retrieved on Aug. 20, 2017].

\* cited by examiner

FREQUENCY HOPPING IN AN UPLINK
CONTROL CHANNEL

CROSS REFERENCES

The present Application for Patent claims the benefit of U.S. Provisional Patent Application No. 62/538,544 by Huang et al., entitled "FREQUENCY HOPPING IN AN UPLINK CONTROL CHANNEL," filed Jul. 28, 2017, assigned to the assignee hereof, and expressly incorporated herein.

BACKGROUND

The following relates generally to wireless communication, and more specifically to frequency hopping in an uplink control channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may transmit data to a UE over a downlink channel, and a UE may transmit data to a base station over an uplink channel. In some examples, a base station may schedule a UE for an uplink transmission by reserving one or more uplink communication resources for the UE. When scheduling a UE, a base station may send a grant to the UE indicating which uplink communication resources have been reserved. The UE may then map an uplink transmission of queued information to the uplink communication resources. In some cases, the uplink communication resources may include uplink resources for transmitting control information, which may be located in a physical uplink control channel (PUCCH), or uplink resources for transmitting user data, which may be located in a physical uplink shared channel (PUSCH). An uplink control or data resource may be associated with a certain time period and frequency location, which may also be referred to as a symbol location.

In some examples, a base station allocates communication resources to the UE within a single frequency bandwidth. However, transmissions over a single frequency bandwidth may be vulnerable to interference that is unique to that frequency bandwidth. In some cases, frequency hopping (e.g., transmitting a first portion of a transmission in a first frequency bandwidth and a second portion of the transmission in a second frequency bandwidth) may be used to achieve frequency diversity and to prevent frequency-specific interference from degrading a full transmission.

SUMMARY

A wireless communications system may employ enhanced frequency hopping techniques in an uplink control channel. In one example, a wireless device may receive an allocation of uplink resources for an uplink transmission of uplink control information (UCI) over a physical uplink control channel (PUCCH). The wireless device may identify a frequency hopping location within the PUCCH based on the length of the PUCCH and a number of bits used to represent the UCI. In some cases, the frequency hopping location partitions the PUCCH into a first set of symbol periods and a second set of symbol periods. After identifying the frequency hopping location, the wireless device may transmit a UCI message, which may include information and reference symbols, over a first frequency bandwidth during the first set of symbol periods and over a second frequency bandwidth during the second set of symbol periods.

A method of wireless communication is described. The method may include identifying a number of symbols of an uplink control channel, determining a frequency hopping position within the uplink control channel for transmitting an uplink control message based at least in part on the number of symbols of the uplink control channel or a number of information bits associated with the uplink control message, or both, and transmitting the uplink control message over a first frequency bandwidth during a first subset of symbols and over a second frequency bandwidth during a second subset of symbols according to the frequency hopping position.

An apparatus for wireless communication is described. The apparatus may include means for identifying a number of symbols of an uplink control channel, means for determining a frequency hopping position within the uplink control channel for transmitting an uplink control message based at least in part on the number of symbols of the uplink control channel or a number of information bits associated with the uplink control message, or both, and means for transmitting the uplink control message over a first frequency bandwidth during a first subset of symbols and over a second frequency bandwidth during a second subset of symbols according to the frequency hopping position.

Another apparatus for wireless communication is described. The apparatus may include a processor, memory in electronic communication with the processor, and instructions stored in the memory. The instructions may be operable to cause the processor to identify a number of symbols of an uplink control channel, determine a frequency hopping position within the uplink control channel for transmitting an uplink control message based at least in part on the number of symbols of the uplink control channel or a number of information bits associated with the uplink control message, or both, and transmit the uplink control message over a first frequency bandwidth during a first subset of symbols and over a second frequency bandwidth during a second subset of symbols according to the frequency hopping position.

A non-transitory computer readable medium for wireless communication is described. The non-transitory computer-readable medium may include instructions operable to cause a processor to identify a number of symbols of an uplink control channel, determine a frequency hopping position within the uplink control channel for transmitting an uplink control message based at least in part on the number of symbols of the uplink control channel or a number of information bits associated with the uplink control message, or both, and transmit the uplink control message over a first frequency bandwidth during a first subset of symbols and over a second frequency bandwidth during a second subset of symbols according to the frequency hopping position.

Some examples of the method, apparatus, and non-transitory computer-readable medium described above may further include processes, features, means, or instructions for determining that the number of information bits associated with the uplink control message may be less than or equal to a threshold.

Some examples of the method, apparatus, and non-transitory computer-readable medium described above may further include processes, features, means, or instructions for calculating a duration of the first subset of symbols by taking a floor function of the number of symbols divided by two. Some examples of the method, apparatus, and non-transitory computer-readable medium described above may further include processes, features, means, or instructions for calculating a duration of the second subset of symbols by subtracting the duration of the first subset of symbols from the number of symbols.

In some examples of the method, apparatus, and non-transitory computer-readable medium described above, the frequency hopping position may be determined based at least in part on a relationship between information symbols and reference symbols in the uplink control message.

Some examples of the method, apparatus, and non-transitory computer-readable medium described above may further include processes, features, means, or instructions for determining that dividing the number of symbols by four yields an integer value. Some examples of the method, apparatus, and non-transitory computer-readable medium described above may further include processes, features, means, or instructions for calculating a duration of the first subset of symbols by multiplying the integer value by two. Some examples of the method, apparatus, and non-transitory computer-readable medium described above may further include processes, features, means, or instructions for calculating a duration of the second subset of symbols by multiplying the integer value by two.

Some examples of the method, apparatus, and non-transitory computer-readable medium described above may further include processes, features, means, or instructions for determining that dividing the number of symbols by four yields an integer value and a remainder of one. Some examples of the method, apparatus, and non-transitory computer-readable medium described above may further include processes, features, means, or instructions for calculating a duration of the first subset of symbols by multiplying the integer value by two. Some examples of the method, apparatus, and non-transitory computer-readable medium described above may further include processes, features, means, or instructions for calculating a duration of the second subset of symbols by multiplying the integer value by two and adding one.

Some examples of the method, apparatus, and non-transitory computer-readable medium described above may further include processes, features, means, or instructions for determining that dividing the number of symbols by four yields an integer value and a remainder of two. Some examples of the method, apparatus, and non-transitory computer-readable medium described above may further include processes, features, means, or instructions for calculating a duration of the first subset of symbols by multiplying the integer value by two. Some examples of the method, apparatus, and non-transitory computer-readable medium described above may further include processes, features, means, or instructions for calculating a duration of the second subset of symbols by multiplying the integer value by two and adding two.

Some examples of the method, apparatus, and non-transitory computer-readable medium described above may further include processes, features, means, or instructions for determining that dividing the number of symbols by four yields an integer value and a remainder of three. Some examples of the method, apparatus, and non-transitory computer-readable medium described above may further include processes, features, means, or instructions for calculating a duration of the first subset of symbols by multiplying the integer value by two and adding one. Some examples of the method, apparatus, and non-transitory computer-readable medium described above may further include processes, features, means, or instructions for calculating a duration of the second subset of symbols by multiplying the integer value by two and adding two.

In some examples of the method, apparatus, and non-transitory computer-readable medium described above, the uplink control message comprises one or more information symbols and one or more reference symbols that alternate with one another in time.

Some examples of the method, apparatus, and non-transitory computer-readable medium described above may further include processes, features, means, or instructions for calculating a duration of the first subset of symbols and a duration of the second subset of symbols, wherein at least one of the first subset of symbols and the second subset of symbols comprises an equal number of information symbols and reference symbols, and wherein an absolute value of a difference between a number of the first subset of symbols and a number of the second subset of symbols may be less than or equal to two.

Some examples of the method, apparatus, and non-transitory computer-readable medium described above may further include processes, features, means, or instructions for determining that the number of information bits associated with the uplink control message may be greater than a threshold.

Some examples of the method, apparatus, and non-transitory computer-readable medium described above may further include processes, features, means, or instructions for calculating a duration of the first subset of symbols by taking a floor function of the number of symbols divided by two. Some examples of the method, apparatus, and non-transitory computer-readable medium described above may further include processes, features, means, or instructions for calculating a duration of the second subset of symbols by subtracting the duration of the first subset of symbols from the number of symbols.

Some examples of the method, apparatus, and non-transitory computer-readable medium described above may further include processes, features, means, or instructions for calculating a duration of the first subset of symbols and a duration of the second subset of symbols, wherein an absolute value of a difference between a number of the first subset of symbols and a number of the second subset of symbols may be less than or equal to one.

In some examples of the method, apparatus, and non-transitory computer-readable medium described above, the uplink control message comprises one or more information symbols and one or more reference symbols that alternate with one another in time.

Some examples of the method, apparatus, and non-transitory computer-readable medium described above may further include processes, features, means, or instructions for receiving an uplink grant that allocates the number of symbols to the UE.

Some examples of the method, apparatus, and non-transitory computer-readable medium described above may further include processes, features, means, or instructions for receiving an indication to use frequency hopping for transmissions over the uplink control channel.

Some examples of the method, apparatus, and non-transitory computer-readable medium described above may further include processes, features, means, or instructions for identifying the number of information bits in the uplink control message based at least in part on a format of the uplink control channel.

In some examples of the method, apparatus, and non-transitory computer-readable medium described above, a duration of the first subset of symbols and a duration of the second subset of symbols are unequal.

A method of wireless communication is described. The method may include identifying a number of symbols of an uplink control channel, determining a frequency hopping position within the uplink control channel for transmitting an uplink control message based at least in part on the number of symbols of the uplink control channel or a number of information bits associated with the uplink control message, or both, and receiving the uplink control message over a first frequency bandwidth during a first subset of symbols and over a second frequency bandwidth during a second subset of symbols according to the frequency hopping position.

An apparatus for wireless communication is described. The apparatus may include means for identifying a number of symbols of an uplink control channel, means for determining a frequency hopping position within the uplink control channel for transmitting an uplink control message based at least in part on the number of symbols of the uplink control channel or a number of information bits associated with the uplink control message, or both, and means for receiving the uplink control message over a first frequency bandwidth during a first subset of symbols and over a second frequency bandwidth during a second subset of symbols according to the frequency hopping position.

Another apparatus for wireless communication is described. The apparatus may include a processor, memory in electronic communication with the processor, and instructions stored in the memory. The instructions may be operable to cause the processor to identify a number of symbols of an uplink control channel, determine a frequency hopping position within the uplink control channel for transmitting an uplink control message based at least in part on the number of symbols of the uplink control channel or a number of information bits associated with the uplink control message, or both, and receive the uplink control message over a first frequency bandwidth during a first subset of symbols and over a second frequency bandwidth during a second subset of symbols according to the frequency hopping position.

A non-transitory computer readable medium for wireless communication is described. The non-transitory computer-readable medium may include instructions operable to cause a processor to identify a number of symbols of an uplink control channel, determine a frequency hopping position within the uplink control channel for transmitting an uplink control message based at least in part on the number of symbols of the uplink control channel or a number of information bits associated with the uplink control message, or both, and receive the uplink control message over a first frequency bandwidth during a first subset of symbols and over a second frequency bandwidth during a second subset of symbols according to the frequency hopping position.

Some examples of the method, apparatus, and non-transitory computer-readable medium described above may further include processes, features, means, or instructions for determining that the number of information bits associated with the uplink control message may be less than or equal to a threshold.

Some examples of the method, apparatus, and non-transitory computer-readable medium described above may further include processes, features, means, or instructions for calculating a duration of the first subset of symbols by taking a floor function of the number of symbols divided by two. Some examples of the method, apparatus, and non-transitory computer-readable medium described above may further include processes, features, means, or instructions for calculating a duration of the second subset of symbols by subtracting the duration of the first subset of symbols from the number of symbols.

In some examples of the method, apparatus, and non-transitory computer-readable medium described above, the frequency hopping position may be determined based at least in part on a relationship between information symbols and reference symbols in the uplink control message.

Some examples of the method, apparatus, and non-transitory computer-readable medium described above may further include processes, features, means, or instructions for determining that dividing the number of symbols by four yields an integer value. Some examples of the method, apparatus, and non-transitory computer-readable medium described above may further include processes, features, means, or instructions for calculating a duration of the first subset of symbols by multiplying the integer value by two. Some examples of the method, apparatus, and non-transitory computer-readable medium described above may further include processes, features, means, or instructions for calculating a duration of the second subset of symbols by multiplying the integer value by two.

Some examples of the method, apparatus, and non-transitory computer-readable medium described above may further include processes, features, means, or instructions for determining that dividing the number of symbols by four yields an integer value and a remainder of one. Some examples of the method, apparatus, and non-transitory computer-readable medium described above may further include processes, features, means, or instructions for calculating a duration of the first subset of symbols by multiplying the integer value by two. Some examples of the method, apparatus, and non-transitory computer-readable medium described above may further include processes, features, means, or instructions for calculating a duration of the second subset of symbols by multiplying the integer value by two and adding one.

Some examples of the method, apparatus, and non-transitory computer-readable medium described above may further include processes, features, means, or instructions for determining that dividing the number of symbols by four yields an integer value and a remainder of two. Some examples of the method, apparatus, and non-transitory computer-readable medium described above may further include processes, features, means, or instructions for calculating a duration of the first subset of symbols by multiplying the integer value by two. Some examples of the method, apparatus, and non-transitory computer-readable medium described above may further include processes, features, means, or instructions for calculating a duration of the second subset of symbols by multiplying the integer value by two and adding two.

Some examples of the method, apparatus, and non-transitory computer-readable medium described above may further include processes, features, means, or instructions for determining that dividing the number of symbols by four yields an integer value and a remainder of three. Some examples of the method, apparatus, and non-transitory computer-readable medium described above may further include processes, features, means, or instructions for calculating a duration of the first subset of symbols by multiplying the integer value by two and adding one. Some examples of the method, apparatus, and non-transitory computer-readable medium described above may further include processes, features, means, or instructions for calculating a duration of the second subset of symbols by multiplying the integer value by two and adding two.

In some examples of the method, apparatus, and non-transitory computer-readable medium described above, the uplink control message comprises one or more information symbols and one or more reference symbols that alternate with one another in time.

Some examples of the method, apparatus, and non-transitory computer-readable medium described above may further include processes, features, means, or instructions for calculating a duration of the first subset of symbols and a duration of the second subset of symbols, wherein at least one of the first subset of symbols and the second subset of symbols comprises an equal number of information symbols and reference symbols, and wherein an absolute value of a difference between a number of the first subset of symbols and a number of the second subset of symbols may be less than or equal to two.

Some examples of the method, apparatus, and non-transitory computer-readable medium described above may further include processes, features, means, or instructions for determining that the number of information bits associated with the uplink control message may be greater than a threshold.

Some examples of the method, apparatus, and non-transitory computer-readable medium described above may further include processes, features, means, or instructions for calculating a duration of the first subset of symbols by taking a floor function of the number of symbols divided by two. Some examples of the method, apparatus, and non-transitory computer-readable medium described above may further include processes, features, means, or instructions for calculating a duration of the second subset of symbols by subtracting the duration of the first subset of symbols from the number of symbols.

Some examples of the method, apparatus, and non-transitory computer-readable medium described above may further include processes, features, means, or instructions for calculating a duration of the first subset of symbols and a duration of the second subset of symbols, wherein an absolute value of a difference between a number of the first subset of symbols and a number of the second subset of symbols may be less than or equal to one.

In some examples of the method, apparatus, and non-transitory computer-readable medium described above, the uplink control message comprises one or more information symbols and one or more reference symbols that alternate with one another in time.

Some examples of the method, apparatus, and non-transitory computer-readable medium described above may further include processes, features, means, or instructions for transmitting an uplink grant that indicates a format of the uplink control channel, wherein the format of the uplink control channel may be associated with the number of information bits in the uplink control message.

Some examples of the method, apparatus, and non-transitory computer-readable medium described above may further include processes, features, means, or instructions for transmitting an indication to use frequency hopping for transmissions over the uplink control channel.

In some examples of the method, apparatus, and non-transitory computer-readable medium described above, a duration of the first subset of symbols and a duration of the second subset of symbols are unequal.

DETAILED DESCRIPTION

Figure 1:
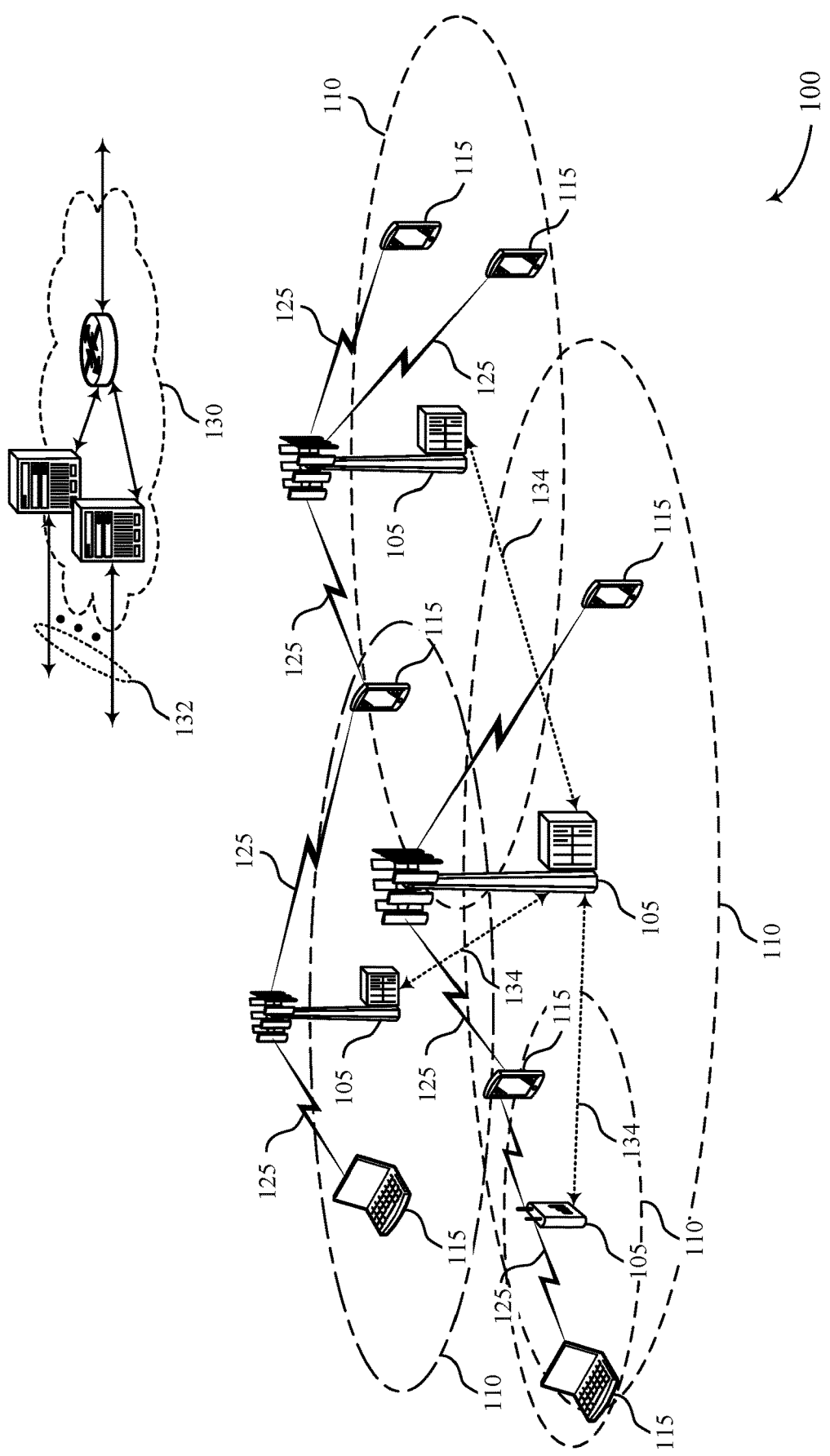
FIG. 1 illustrates an example of a wireless communications system that supports frequency hopping in an uplink control channel in accordance with various aspects of the present disclosure.

Limiting a transmission to communication resources in a single frequency bandwidth may result in transmission failures due to frequency-specific interference, despite other frequency bandwidths being available for reduced-interference transmission. Frequency hopping may provide communicating devices with frequency diversity, allowing the communicating devices to avoid transmission failures due to frequency-specific interference. Frequency hopping patterns may be used to implement frequency hopping and may include one or more successive frequency hops, where each frequency hop may use a different frequency bandwidth than the previous frequency hop.

In some cases, a wireless communications system may employ enhanced frequency hopping techniques in a physical uplink control channel (PUCCH) for transmitting uplink control information (e.g., a UCI message). A frequency hopping technique may include determining a frequency hopping position, which may be a duration or symbol period location within a channel where transmission of a message transitions from one frequency bandwidth to another frequency bandwidth. A hop or frequency hop may be referred to as a duration (e.g., measured in a number of symbol periods) over which a message is being transmitted over a single frequency bandwidth. For example, if a frequency hopping pattern includes two frequency hops, then a message may be transmitted over a first frequency bandwidth for a duration (e.g., a first hop), and then transmitted over a second frequency bandwidth for a duration (e.g., a second hop). In accordance with aspects of the present disclosure, a frequency hopping position may be calculated to yield certain characteristics of a transmission, such as a ratio of information bits to reference signal bits.

In some examples, the PUCCH may be referred to as a long PUCCH, which may support from four to fourteen symbol periods in length. A UCI message may include information symbols that convey encoded UCI bits and reference symbols (e.g., DMRS) that facilitate decoding the encoded UCI bits—e.g., by providing the receiving device with a reference for determining a channel estimate. In some cases, a UCI message is constructed such that the information and reference symbols alternate in time. For example, {RURURUR} and {URURURU} may be example UCI message patterns, where the letter 'R' indicates a reference symbol and the letter 'U' indicates an information symbol. The preceding example UCI message patterns may have a 50% reference symbol density—i.e., there are as many reference symbols as information symbols. {UURUU} and {URURU} are also example UCI message patterns, which may have less than a 50% reference symbol density.

In one example, frequency hopping patterns may be constructed for PUCCH transmissions based on a number of bits used to represent UCI. For instance, for a long PUCCH of a first length, a first frequency hopping pattern may be used if the number of UCI bits is less than or equal to a bit threshold (e.g., two bits), and a second frequency hopping pattern may be used if the number of UCI bits is more than the bit threshold. Frequency hopping patterns may also be constructed based on a length of, or number of symbol periods included in, a long PUCCH. For instance, a first frequency hopping pattern may be used when the long PUCCH spans a first number of symbol periods, and a second frequency hopping pattern may be used when the long PUCCH spans a second number of symbol periods.

In some examples, frequency hopping patterns may be constructed based on a number of bits used to represent UCI and a length of a long PUCCH. For instance, a first frequency hopping pattern may be used for a first UCI bit size when the long PUCCH spans a first number of symbol periods, and a second frequency hopping pattern may be used for the first UCI bit size when the long PUCCH spans a second number of symbol periods. Moreover, a third frequency hopping pattern may be used for a second UCI bit size when the long PUCCH spans the first number of symbol periods. For example, for a PUCCH that spans 6 symbol periods and a UCI with one bit, a frequency hopping pattern may be constructed including a first frequency hop that spans two symbol periods and a second frequency hop that spans four symbol periods. For a PUCCH that spans seven symbol periods and a UCI with one bit, a frequency hopping pattern may be constructed including a first frequency hop that spans three symbol periods and a second frequency hop that spans four symbol periods. And for a PUCCH that spans six symbol periods and a UCI with four bits, a frequency hopping pattern may be constructed including a first frequency hop that spans three symbol periods and a second frequency hop that spans three symbol periods.

In some cases, a frequency hopping pattern may be further constructed based on a desired demodulation reference signal (DMRS) density for each frequency hop in the frequency hopping pattern. In some examples, the desired DMRS density for each frequency hop is based on the number of UCI bits. For instance, for UCI with less than or equal to two bits, a desired DMRS density for each frequency hop may be 50%—i.e., each frequency hop has as many information symbols and reference symbols. While for UCI with more than two bits, there may be no desired DMRS density. Thus, for a PUCCH that spans six symbol periods and a UCI with one bit, a frequency hopping pattern may be constructed including a first frequency hop that spans two symbol periods and a second frequency hop that spans four symbol periods, where {RU} represent the symbols transmitted during the first frequency hop and {RURU} represents the symbols transmitted during the second frequency hop. While for a PUCCH that spans six symbol periods and a UCI with three bits, a frequency hopping pattern may be constructed including a first frequency hop that spans three symbol periods and a second frequency hop that spans three symbol periods, where {URU} represents the symbols transmitted during the first frequency hop and {URU} represents the symbols transmitted during the second frequency hop.

Features of the disclosure introduced above are further described below in the context of a wireless communication system. Specific examples are then described of an example process flow for frequency hopping in an uplink control channel. These and other features of the disclosure are further illustrated by and described with reference to apparatus diagrams, system diagrams, and flowcharts that relate to frequency hopping in an uplink control channel.

FIG. 1 illustrates an example of a wireless communications system 100 that supports frequency hopping in an uplink control channel in accordance with various aspects of the present disclosure. The wireless communications system 100 includes base stations 105, user equipment (UEs) 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. In accordance with aspects of the present disclosure, the wireless communications system 100 may support frequency hopping in an uplink channel, and more specifically determining a frequency hopping position based on a number of information bits associated with an uplink message and a length of the uplink channel.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or a machine-type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Base stations 105 may wirelessly communicate with UEs 115 via one or more base station antennas. Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

Base stations 105 may also communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may transmit control information to a UE 115 over a physical downlink control channel (PDCCH) and data over a physical downlink shared channel (PDSCH). In some cases, a first subset of communication resources is allocated to the PDCCH and a second subset of communication resources is allocated to the PDSCH. Similarly, a UE 115 may transmit control information to a base station over a PUCCH and data over a physical uplink shared channel (PUSCH). In some cases, a first subset of communication resources is allocated to the PUCCH and a second subset of communication resources is allocated to the PUSCH. In some examples, the structure of the PUCCH may vary. For instance, the PUCCH may be a short PUCCH, which may span two or less symbol periods, or a long PUCCH, which may span four or more symbol periods.

In some cases, UEs 115 and base stations 105 may transmit information using frequency hopping to achieve frequency diversity and mitigate the effects of frequency-specific interference on a transmission. A device using frequency hopping techniques may partition a transmission so that a portion of the transmission is transmitted on one frequency during a first frequency hop and another portion of the transmission is transmitted on another frequency during a second frequency hop. The combination of frequency hops may be referred to as a frequency hopping pattern, which may include up to N frequency hops over M frequencies. In some examples, a base station 105 may transmit, to a UE 115, downlink control information (DCI) including an uplink resource block assignment and an uplink frequency hopping flag, that when set, triggers the UE 115 to perform frequency hopping during a corresponding uplink transmission. When the frequency hopping flag is not set, the UE 115 may perform a scheduled uplink transmission over the resources allocated in the resource block assignment using a single frequency. In some examples, the base station 105 transmits the uplink scheduling information in response to a scheduling request received from the UE 115. In other examples, the UE 115 is periodically or semi-periodically scheduled to transmit on certain uplink resources.

A UE 115 may transmit uplink information over scheduled uplink resources. The UE 115 may generate UCI for uplink transmissions of control information, which may include HARQ feedback and/or a channel state information (CSI) report. A CSI report may include channel quality information (CQI) generated by the UE based on measured channel conditions. In some cases, the UE 115 may transmit UCI to the base station 105 using PUCCH resources in a UCI message. A UCI message may be constructed according to different UCI formats, and a varying number of UCI bits may be included in the UCI message based on the corresponding format. In some cases, the number of bits used to represent UCI (or "UCI bits") is based on an assigned PUCCH format. For example, for PUCCH format 1a, one bit may be used to convey HARQ feedback, while for PUCCH format 2, twenty bits may be used to convey CQI. In some examples, the UE 115 may identify the PUCCH format based on a location of the PUCCH resources in the carrier bandwidth. For instance, the outer part of the carrier bandwidth may be allocated to PUCCH formats 2, 2a, and 2b, while the inner part of the carrier bandwidth may be allocated to PUCCH formats 1, 1a, and 2b.

In some cases, the UCI message may include information symbols that convey encoded UCI bits and reference symbols, such as DMRS, that facilitate decoding the encoded UCI bits—e.g., by providing the receiving device with a reference for determining a channel estimate. In some cases, the UCI message is constructed such that the information and reference symbols alternate in time. For example, {RURURUR} and {URURURU} may be example patterns used by a UCI message, where the letter 'It' indicates a reference symbol and the letter 'U' indicates an information symbol. In some examples, a reference symbol density of 50%—i.e., an equal number of information symbols and reference symbols—is desired for UCI message transmissions. In other examples, a reference symbol density of less than 50% is desired for UCI message transmissions—e.g., when the number of UCI bits is greater than 2. For example, a UCI message may have a pattern {UURUU} or {UUU-RUUU}.

As discussed above, frequency hopping may be used to provide resilience against frequency-specific interference, and a UE 115 may utilize frequency hopping when transmitting a UCI message—e.g., when requested by a base station or after identifying frequency-specific interference. However, for certain UCI formats, partitioning a UCI message into multiple frequency hops may result in an undesirable reference symbol density (e.g., below 50%) for portions of the UCI message transmitted during the frequency hops. For example, for a UCI with less than or equal to two bits and for a PUCCH that spans six symbol periods, transmitting a UCI message over a first frequency hop of three symbol periods and a second frequency hop of three subsequent symbol periods may result in the first portion of the UCI message, which may be represented as {URU}, being transmitted during the first frequency hop with a 33.3% reference symbol density, and the second portion of the UCI message, which may be represented as {URU}, being transmitted during the second frequency hop with a 33.3% reference symbol density.

A device, such as a UE 115 or base station 105, may transmit/receive a resource allocation in a long PUCCH (which may vary in size from 4-14 symbol periods) and identify a number of UCI bits to be conveyed in a UCI message—e.g., based on a scheduled PUCCH format. The device may then determine a first number of symbol periods in the long PUCCH for a first frequency hop and a second number of symbol periods in the long PUCCH for a second frequency hop based on the length of the long PUCCH and the number of UCI bits. A UE 115 may transmit the UCI message over a first frequency during the first frequency hop and over a second frequency during the second frequency hop. A base station may transmit the UCI message over a first frequency during the first frequency hop and over a second frequency during the second frequency hop.

Figure 2:
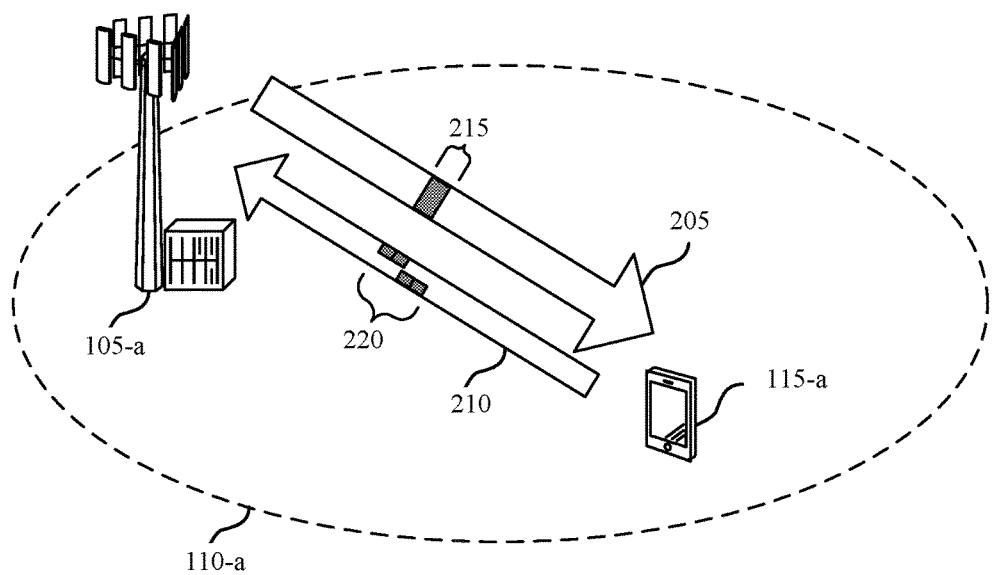
FIG. 2 illustrates an example of a wireless communications subsystem that supports frequency hopping in an uplink control channel in accordance with various aspects of the present disclosure.

FIG. 2 illustrates an example of a wireless communications subsystem 200 that supports frequency hopping in an uplink control channel in accordance with various aspects of the present disclosure. Wireless communications subsystem 200 may include UE 115-a and base station 105-a, which may be examples of a UE 115 or a base station 105 as described above with reference to FIG. 1, and may communicate with one another over downlink 205 and uplink 210.

Base station 105-a may transmit control information and data to UE 115-a via downlink 205. In some examples, base station 105-a transmits DCI message 215 to UE 115-a over downlink 205. DCI message 215 may include an indication of a location of downlink resources carrying a transmission for UE 115-a, a transmit power command (TPC), frequency hopping information, and the like, to UE 115-a. In some cases, DCI message 215 includes an uplink grant scheduling UE 115-a for an uplink transmission during reserved uplink resources—e.g., by indicating time and frequency resources that are allocated to UE 115-a.

UE 115-a may transmit control information and data to base station 105-a over uplink resources identified from an uplink grant received from base station 105-a. In some cases, UE 115-a is allocated resources in an uplink control channel (e.g., a PUCCH or long PUCCH) and transmits control information, such as UCI message 220. In some examples, UE 115-a uses a frequency hopping pattern for transmitting UCI message 220. For example, UE 115-a may transmit a first portion of UCI message 220 during a first frequency hop over a first frequency bandwidth and a second portion of UCI message 220 during a second frequency hop over a second frequency bandwidth.

As discussed above, UCI message 220 may be constructed according to a number of different formats, and a varying number of UCI bits may be conveyed in UCI message 220 based on the selected format. For instance, one bit may be used to represent the UCI for PUCCH format 1a and twenty bits may be used to represent the UCI for PUCCH format 2. In some cases, UCI message 220 may include information symbols that convey encoded UCI bits and reference symbols, such as DMRS, that facilitate decoding the encoded UCI bits. In some cases, UCI message 220 is constructed such that the information and reference symbols alternate in time. For example, {RURURUR} and {URURURU} may be example patterns of UCI message 220, where the letter 'R' indicates a reference symbol and the letter 'U' indicates an information symbol.

In some examples, UE 115-a may determine the frequency hopping pattern for transmitting UCI message 220 based on a format of the PUCCH (e.g., format 0, format 1, etc.), or a number of bits used to convey the UCI (or "UCI bits") in, UCI message 220 and a length of, or a number of symbol periods allocated for, a long PUCCH. For example, for two or less UCI bits and a long PUCCH of four symbol periods, the frequency hopping pattern may split the allocated control resources in half so that the first frequency hop spans two symbol periods and the second frequency hop spans two subsequent symbol periods. While for two or less UCI bits and a long PUCCH of six symbols, the frequency hopping pattern may not split the allocated control resources in half, but instead, includes a first frequency hop of two symbol periods and a second frequency hop of four symbol periods.

In some examples, the different frequency hopping patterns are determined based on a desired reference symbol density for each frequency hop. For example, for the long PUCCH with six symbols, the first frequency hop of two symbol periods may be represented as {UR}, and the second frequency hop of four symbol periods may be represented as {URUR}, and a 50% reference symbol density may be present for both frequency hops. While if the frequency hopping pattern were split into a first frequency hop of three symbol periods, which may be represented as {URU}, and a second frequency hop of three symbol periods, which may be represented as {URU}, then both frequency hops may have a 33.3% reference symbol density.

In some examples, the desired reference symbol density for each frequency hop depends on a number of UCI bits. For example, if UCI message 220 conveys less than or equal to a threshold number of UCI (e.g., 2 bits), a 50% reference symbol density—i.e., a UCI message with an even number of information symbols and reference symbols—may be desired. Since a long PUCCH may vary in size, different frequency hopping patterns may be used to ensure that the desired reference symbol density is maintained in long PUCCHs of different sizes.

The following set of equations may be used to identify a frequency hopping location and achieve a 50% reference symbol density in at least one frequency hop of a frequency hopping pattern when the number of UCI bits is less than or equal to a threshold value. The following equations are provided as examples, and other techniques or formulations may be used in accordance with aspects of the present disclosure to determine a frequency hopping pattern or a frequency hopping location. For example, different equations may be used if the number of frequency hops used for a transmission is greater than two.

$$M = \text{floor}\left(\frac{N}{4}\right); \text{ and} \quad (1)$$

For $N \bmod 4 = 0$: $Hop_1 = 2M$; $Hop_2 = 2M$

For $N \bmod 4 = 1$: $Hop_1 = 2M$; $Hop_2 = 2M + 1$; OR $Hop_1 = 2M + 1$; $Hop_2 = 2M$ For $N \bmod 4 = 2$: $Hop_1 = 2M$; $Hop_2 = 2M + 2$; OR $Hop_1 = 2M + 2$; $Hop_2 = 2M$ For $N \bmod 4 = 3$: $Hop_1 = 2M + 1$; $Hop_2 = 2M + 2$; OR $Hop_1 = 2M + 2$; $Hop_2 = 2M + 1$, where N represents the number of symbols in the long PUCCH, M represents an integer value, $Hop_1$ represents the number of symbols in the first frequency hop, and $Hop_2$ represents the number of symbols in the second frequency hop.

Table 1 represents the result of applying the equation set 1 for long PUCCHs of varying sizes when the number of UCI bits is less than or equal to two bits.

TABLE 1

| UCI bits ≤ 2 bits | | | | |
|---|---|---|---|---|
| N (symbols) | M | N mod 4 | $1^{st}$ Hop (symbols) | $2^{nd}$ Hop (symbols) |
| 4 | 1 | 0 | 2 | 2 |
| 5 | 1 | 1 | 2 | 3 |
| 6 | 1 | 2 | 2 | 4 |
| 7 | 1 | 3 | 3 | 4 |
| 8 | 2 | 0 | 4 | 4 |
| 9 | 2 | 1 | 4 | 5 |
| 10 | 2 | 2 | 4 | 6 |
| 11 | 2 | 3 | 5 | 6 |
| 12 | 3 | 0 | 6 | 6 |
| 13 | 3 | 1 | 6 | 7 |
| 14 | 3 | 2 | 6 | 8 |

As discussed above, the desired reference symbol density for each frequency hop depends on a number of UCI bits. For example, if UCI message 220 conveys more than or a threshold number of UCI (e.g., 2 bits), a less than 50% reference symbol density—i.e., a UCI message with an even number of information symbols and reference symbols—may be desired. For instance, if UCI message 220 that conveys three to ten UCI bits, at least two reference symbols per frequency hop may be desired—e.g., {URURU}, {URURUU}, {UURURUU}, and so on. While if UCI message 220 conveys more than ten UCI bits, one reference symbol per frequency hop may be desired—e.g., {UURUU}, {UUURUUU}, and so on.

If UCI message 220 conveys more than two UCI bits, a frequency hopping pattern for a long PUCCH may be constructed so that a difference between a number of symbol periods allocated to the first frequency hop and a number of symbol periods allocated to the second frequency hop is less than or equal to one. In some cases, the size of the frequency hops are determined without considering reference symbol density. In some cases, the information/reference symbol pattern used for the determined frequency hops is based on the size of the frequency hops and the number of UCI bits conveyed by UCI message 220. For example, if a frequency hop spans five symbol periods and six UCI bits are conveyed, a frequency hop may be represented as {URURU}. While if a frequency hop spans five symbol periods and twenty UCI bits are conveyed, a frequency hop may be represented as {UURUU}.

The following set of equations may be used to identify a frequency hop location and evenly split, within one symbol period, a frequency hopping pattern for long PUCCHs of different sizes when the number of UCI bits is more than 2 bits.

$$Hop_1 = \text{floor}\left(\frac{N}{2}\right); Hop_2 = N - \text{floor}\left(\frac{N}{2}\right); \text{OR} \quad (2)$$

$$Hop_1 = N - \text{floor}\left(\frac{N}{2}\right); Hop_2 = \text{floor}\left(\frac{N}{2}\right)$$

Table 2 represents the result of applying equation set 2 for long PUCCHs of varying sizes when the number of UCI bits is more than two bits.

TABLE 2

| UCI bits > 2 bits | | |
|---|---|---|
| N (symbols) | $1^{st}$ Hop (symbols) | $2^{nd}$ Hop (symbols) |
| 4 | 2 | 2 |
| 5 | 2 | 3 |
| 6 | 3 | 3 |
| 7 | 3 | 4 |
| 8 | 4 | 4 |
| 9 | 4 | 5 |
| 10 | 5 | 5 |
| 11 | 5 | 6 |
| 12 | 6 | 6 |
| 13 | 6 | 7 |
| 14 | 7 | 7 |

In some examples, UE 115-a determines the frequency hopping pattern on its own according to the above equations based on identified channel conditions—e.g., based on identifying frequency specific interference. UE 115-a may indicate to base station 105-a that frequency hopping is being used and may further indicate a number of UCI bits conveyed in the UCI message. In some cases, the base station 105-a may know the length of the long PUCCH and use the provided indications to determine the structure of the frequency hopping pattern used by UE 115-a. In some cases, no indication is provided to base station 105-a, and base station 105-a determines the frequency hopping pattern based on a location of the uplink transmission in the PUCCH—e.g., if certain PUCCH resources are allocated to certain PUCCH formats. In some examples, UE 115-a will not use frequency hopping pattern unless a flag enabling frequency hopping is received from base station 105-a.

In some examples, base station 105-a schedules resources for UE 115-a according to a frequency hopping pattern—e.g., based on identifying frequency specific interference.

Base station 105-*a* may set a frequency hopping flag in DCI message 215 directing UE 115-*a* to use frequency hopping. In some examples, base station 105-*a* determines a frequency hopping pattern used by UE 115-*a* for an uplink transmission based on a size of a long PUCCH and a location of the uplink transmission in the PUCCH—e.g., if certain PUCCH resources are allocated to certain PUCCH formats. In other examples, base station 105-*a* determines a frequency hopping pattern used by UE 115-*a* for an uplink transmission based on a size of a long PUCCH and an indication of the number of UCI bits conveyed in UCI message 220.

Figure 3:
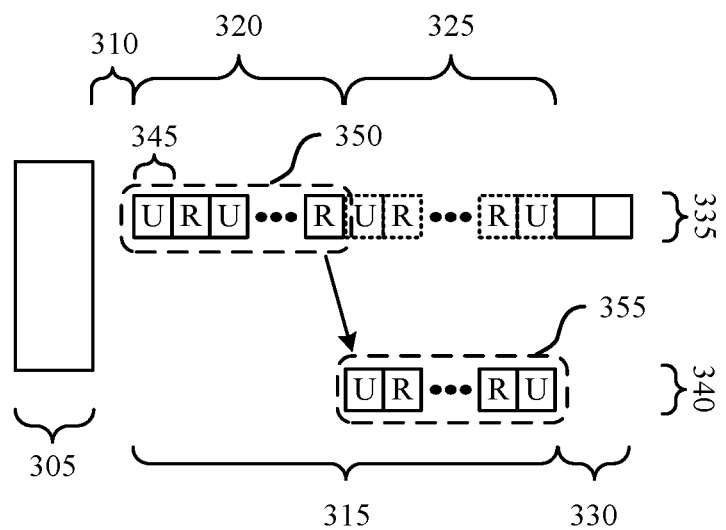
FIG. 3 illustrates an example slot structure that supports frequency hopping in an uplink control channel in accordance with various aspects of the present disclosure.

FIG. 3 illustrates an example of a slot structure 300 for frequency hopping in an uplink control channel in accordance with various aspects of the present disclosure. Slot structure 300 may illustrate aspects of a transmission between a UE 115 and a base station 105, as described above with reference to FIGS. 1-2.

Slot structure 300 may include 14 symbol periods, such as first symbol period 345. Slot structure 300 may include downlink control channel 305 (which may be referred to as PDCCH 305), gap 310, long uplink control channel 315 (which may be referred to as long PUCCH 315), first subset of symbol periods 320, second subset of symbol periods 325, short uplink control channel 330 (which may be referred to as short PUCCH 330), first frequency bandwidth 335, second frequency bandwidth 340, first frequency hop 350, and second frequency hop 355. In some examples, slot structure 300 may be a mini-slot and may include as little as one symbol period.

PDCCH 305 may include resources for transmitting control information to a UE. For instance, PDCCH 305 may carry DCI, which may include an uplink grant, a resource allocation, a TPC command, and the like. In some examples, PDCCH 305 lasts one to three symbol periods and spans a frequency bandwidth.

Gap 310 may be located in time between PDCCH 305 and long PUCCH 315. Gap 310 may provide a receiving device with sufficient time to transition from a receiving mode, during PDCCH 305, to a transmitting mode, during long PUCCH 315. In some examples, gap 310 is a symbol period.

Long PUCCH 315 may include resources for transmitting control information to a base station. For instance, long PUCCH 315 may carry UCI, which may include HARQ feedback, a scheduling request, and/or CQI. In some examples, long PUCCH 315 varies in size—e.g., from 4 symbol periods to 14 symbol periods—and spans a frequency range. In some examples, the frequencies in the frequency range used by long PUCCH 315 completely or partially overlap with the frequency range used by PDCCH 305, frequencies in the frequency range used by long PUCCH 315 do not overlap with the frequency range used by PDCCH 305.

In some cases, long PUCCH 315 may be partitioned into first subset of symbol periods 320 and second subset of symbol periods 325 based on a number of UCI bits and a length of long PUCCH 315. In some examples, first subset of symbol periods 320 and second subset of symbol periods 325 are the same length, while in other cases, first subset of symbol periods 320 and second subset of symbol periods 325 are different lengths (e.g., unequal lengths).

Short PUCCH 330 may also include resources for transmitting control information to a base station. Short PUCCH 330 may be smaller in size than long PUCCH 315. For instance, short PUCCH 330 may be one to two symbol periods.

First frequency bandwidth 335 and second frequency bandwidth 340 may each include at least one sub-carrier, which may span 15 kHz in the frequency domain. In some examples, a resource element, or symbol, may be defined as a time and frequency resources that spans one symbol period and uses one sub-carrier.

In one example, a base station 105 transmits, to a UE 115, DCI including an allocation of uplink resources over long PUCCH 315 in PDCCH 305. In some cases, the DCI also includes a frequency hopping flag directing the UE 115 to use frequency hopping in the corresponding uplink transmission. The UE 115 may receive the DCI and identify the uplink resources reserved for the UE 115 by the base station 105. For instance, the UE 115 may identify a first resource element during first symbol period 345 in first frequency bandwidth 335 and a number of subsequent resource elements in the following symbol periods. In some examples, the UE 115 determines that all of the allocated resource elements are located within a single frequency bandwidth, such as first frequency bandwidth 335. In other examples, the UE 115 determines that some of the allocated resource elements are located in first frequency bandwidth 335, and the remaining allocated resource elements are located in second frequency bandwidth 340. In some examples, the UE 115 makes this determination based on a frequency hopping flag being set in the received DCI. In other examples, the UE 115 makes this determination on its own—e.g., based on channel conditions.

When frequency hopping is active, the UE 115 may identify first frequency hop 350, which may use first frequency bandwidth 335, and second frequency hop 355, which may use second frequency bandwidth 340. In some cases, the UE 115 may identify first frequency hop 350 and second frequency hop 355 based on a number of symbols included in long PUCCH 315 and a number of UCI bits in a UCI message. For instance, the UE 115 may determine the length of the long PUCCH 315 and identify a frequency hopping location in long PUCCH 315 based on the number of UCI bits conveyed in a UCI message. In some examples, the UE 115 may determine a different frequency hopping location in long PUCCH 315 if the number of UCI bits is less than or equal to 2 bits than if the number of UCI bits is more than 2 bits. In some examples, the UE 115 determines the number of UCI bits based on a format of the allocated PUCCH resource—e.g., if PUCCH format 1a is used, the UE may determine that the number of UCI bits is less than 2 bits. In other examples, the UE 115 determines the number of UCI bits based on an uplink control information waiting to be transmitted—e.g., if a CQI report is generated, the UE 115 may determine that the number of UCI bits is more than 2 bits.

If the number of UCI bits is less than or equal to 2 bits, then the frequency hopping location may be determined based on a desired reference symbol density—e.g., 50% reference symbol density. To achieve the desired reference symbol density, the frequency hopping location in long PUCCHs of varying sizes may be determined—e.g., by the base station 105 or the UE 115—using the equations provided in equation set 1. If the number of UCI bits is more than 2 bits, then the frequency hopping location may be determined without taking a desired reference symbol density into account. For instance, the frequency hopping location may be selected to split the resources in long PUCCH 315 as evenly as possible e.g., so that the absolute value of the difference between the number of symbols in first frequency hop 350 and the number of symbols in second frequency hop 355 is less than or equal to one—using the equations provided in equation set 2. When the number of UCI bits is more than 2 bits, the information/reference symbol pattern used for the frequency hops may be based on a number of UCI bits conveyed by a UCI message and desired reference symbol density for the number of UCI bits—e.g., one reference symbol may be used for a frequency hop if there are more than twenty UCI bits, or two reference symbols may be used for a frequency hop if there are between three and twenty UCI bits.

Figure 4A:
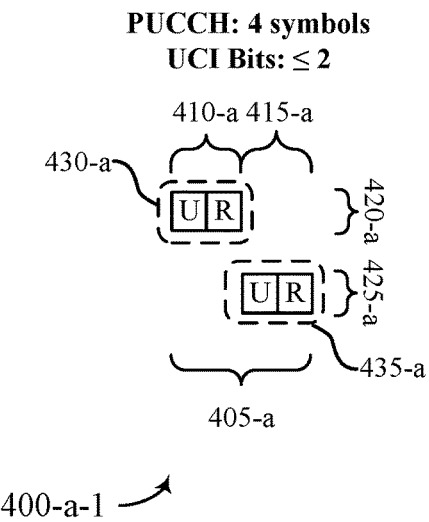
FIGS. 4A through 4C illustrate example frequency hopping patterns that support frequency hopping in an uplink control channel in accordance with various aspects of the present disclosure.
Figure 4A:
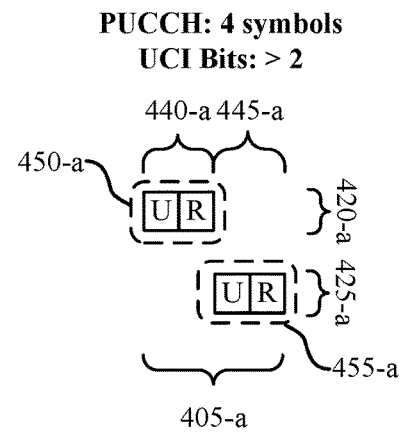

FIG. 4A illustrates an example of frequency hopping patterns 400-a-1 and 400-a-2 for frequency hopping in an uplink control channel in accordance with various aspects of the present disclosure. Frequency hopping pattern 400-a may illustrate aspects of a transmission between a UE 115 and a base station 105, as described above with reference to FIGS. 1-2.

Frequency hopping patterns 400-a-1 and 400-a-2 may include uplink control channel 405-a (which may be referred to as a long PUCCH 405-a), first frequency bandwidth 420-a, and second frequency bandwidth 425-a, which may be examples of uplink control channel 315, first frequency bandwidth 335, and second frequency bandwidth 340 as discussed with reference to FIG. 3.

Frequency hopping patterns 400-a-1 and 400-a-2 may illustrate the different frequency hopping patterns used for a long PUCCH 405-a of a first size based on the number of UCI bits in a UCI message. Frequency hopping pattern 400-a-1 may include a first a first frequency hop 430-a during first subset of symbol periods 410-a that use first frequency bandwidth 420-a and a second frequency hop 435-a during second subset of symbol periods 415-a that uses second frequency bandwidth 425-a. Frequency hopping pattern 400-a-1 may include a first a first frequency hop 450-a during first subset of symbol periods 440-a that use first frequency bandwidth 420-a and a second frequency hop 455-a during second subset of symbol periods 445-a that uses second frequency bandwidth 425-a.

In some examples, a UE or base station may identify that the number of UCI bits is less than or equal to two bits and determine that frequency hopping pattern 400-a-1 is used for long PUCCH 405-a. In some cases, the device identifies frequency hopping pattern 400-a-1 using equation set 1. For example, the device determines that the number of symbols in long PUCCH 405-a, N, is 4 and divides the number of symbols in long PUCCH 405-a by 4 to yield the integer, M, equal to 1 with no remainder. The device may then determine that the number of symbols, or symbol periods in first subset of symbol periods 410-a, for first frequency hop 430-a equals 2*M=2 symbol periods and the number of symbols, or symbol periods in second subset of symbol periods 415-a, for second frequency hop 435-a equals 2*M=2 symbol periods. As depicted in FIG. 4A, the reference symbol density of first frequency hop 430-a is 50% and the reference symbol density of second frequency hop 435-a is 50%.

In some examples, a UE or base station may identify that the number of UCI bits is more than to two bits and determine that frequency hopping pattern 400-a-2 is used for long PUCCH 405-a. In some cases, the device identifies frequency hopping pattern 400-a-2 using equation set 2. For example, the device determines that the number of symbols in long PUCCH 405-a, N, is 4 and determines that the number of symbols, or symbol periods in first subset of symbol periods 410-a, for first frequency hop 430-a is floor(N/2)=2 and the number of symbols, or symbol periods in second subset of symbol periods 415-a, for second frequency hop 435-a is (N−floor(N/2))=2. As shown in FIG. 4A, in some cases, frequency hopping patterns 400-a-1 and 400-a-2 may be the same—e.g., for a long PUCCH that spans four symbol periods. As depicted in FIG. 4A, the reference symbol density of first frequency hop 450-a is 50% and the reference symbol density of second frequency hop 455-a is 50%.

Figure 4B:
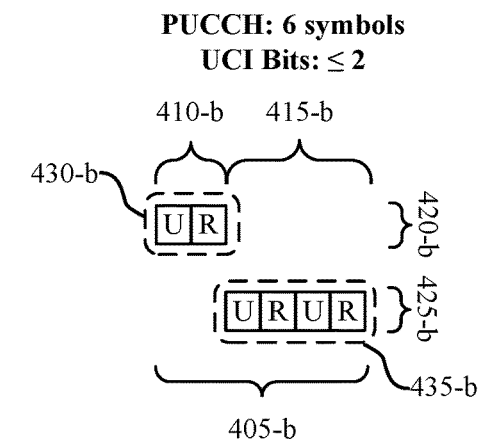
Figure 4B:
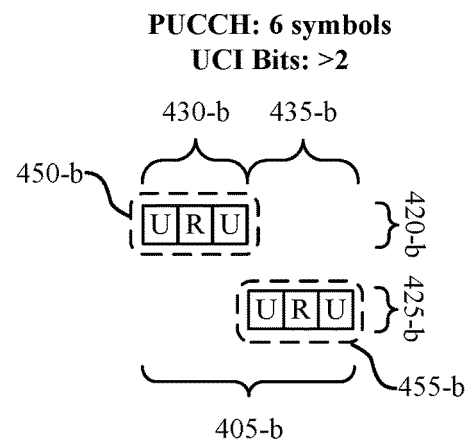

FIG. 4B illustrates an example of frequency hopping patterns 400-b-1 and 400-b-2 for frequency hopping in an uplink control channel in accordance with various aspects of the present disclosure. Frequency hopping pattern 400-b may illustrate aspects of a transmission between a UE 115 and a base station 105, as described above with reference to FIGS. 1-2.

Frequency hopping patterns 400-b-1 and 400-b-2 may include uplink control channel 405-b (which may be referred to as a long PUCCH 405-b), first frequency bandwidth 420-b, and second frequency bandwidth 425-b, which may be examples of uplink control channel 315, first frequency bandwidth 335, and second frequency bandwidth 340 as discussed with reference to FIG. 3.

Frequency hopping patterns 400-b-1 and 400-b-2 may illustrate the different frequency hopping patterns used for a long PUCCH 405-b of a first size based on the number of UCI bits in a UCI message. Frequency hopping pattern 400-b-1 may include a first a first frequency hop 430-b during first subset of symbol periods 410-b that use first frequency bandwidth 420-b and a second frequency hop 435-b during second subset of symbol periods 415-b that uses second frequency bandwidth 425-b. Frequency hopping pattern 400-b-1 may include a first a first frequency hop 450-b during first subset of symbol periods 440-b that use first frequency bandwidth 420-b and a second frequency hop 455-b during second subset of symbol periods 445-b that uses second frequency bandwidth 425-b.

In some examples, a UE or base station may identify that the number of UCI bits is less than or equal to two bits and determine that frequency hopping pattern 400-b-1 is used for long PUCCH 405-b. In some cases, the device identifies frequency hopping pattern 400-b-1 using equation set 1. For example, the device determines that the number of symbols in long PUCCH 405-b, N, is 6 and divides the number of symbols in long PUCCH 405-b by 4 to yield the integer, M, equal to 1 with a remainder of 2. The device may then determine that the number of symbols, or symbol periods in first subset of symbol periods 410-b, for first frequency hop 430-b equals 2*M=2 symbol periods and the number of symbols, or symbol periods in second subset of symbol periods 415-b, for second frequency hop 435-b equals 2*M+2=4 symbol periods. As depicted in FIG. 4B, the reference symbol density of first frequency hop 430-b is 50% and the reference symbol density of second frequency hop 435-b is 50%.

In some examples, a UE or base station may identify that the number of UCI bits is more than to two bits and determine that frequency hopping pattern 400-b-2 is used for long PUCCH 405-b. In some cases, the device identifies frequency hopping pattern 400-b-2 using equation set 2. For example, the device determines that the number of symbols in long PUCCH 405-b, N, is 6 and determines that the number of symbols, or symbol periods in first subset of symbol periods 410-b, for first frequency hop 430-b is floor(N/2)=3 and the number of symbols, or symbol periods in second subset of symbol periods 415-b, for second frequency hop 435-b is (N−floor(N/2))=3. As shown in FIG. 4B, in some cases frequency hopping patterns 400-b-1 and 400-b-2 may be different—e.g., for a long PUCCH that spans six symbol periods. As further depicted in FIG. 4B, the reference symbol density of first frequency hop 450-*b* is 33.3% and the reference symbol density of second frequency hop 455-*b* is 33.3%.

Figure 4C:
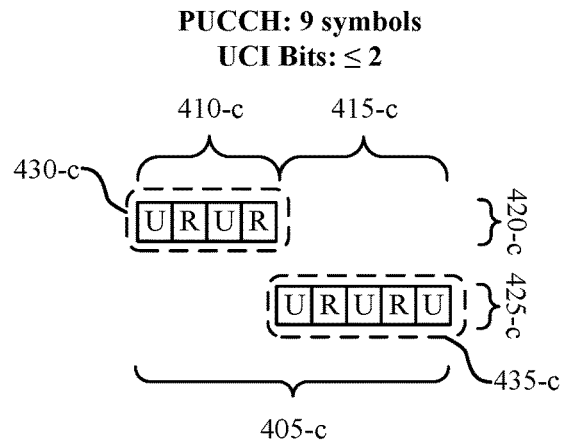
Figure 4C:
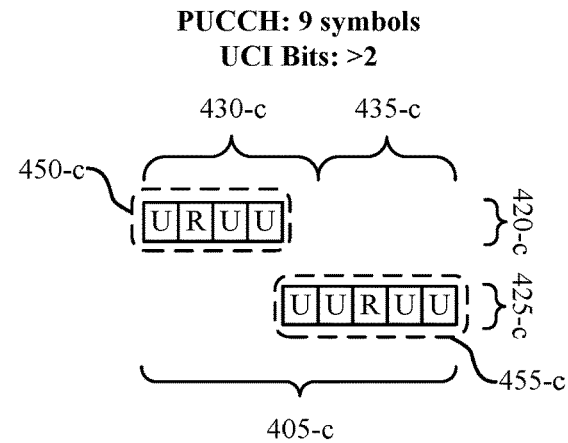

FIG. 4C illustrates an example of frequency hopping patterns 400-*c*-1 and 400-*c*-2 for frequency hopping in an uplink control channel in accordance with various aspects of the present disclosure. Frequency hopping pattern 400-*c* may illustrate aspects of a transmission between a UE 115 and a base station 105, as described above with reference to FIGS. 1-2.

Frequency hopping patterns 400-*c*-1 and 400-*c*-2 may include uplink control channel 405-*c* (which may be referred to as a long PUCCH 405-*c*), first frequency bandwidth 420-*c*, and second frequency bandwidth 425-*c*, which may be examples of uplink control channel 315, first frequency bandwidth 335, and second frequency bandwidth 340 as discussed with reference to FIG. 3.

Frequency hopping patterns 400-*c*-1 and 400-*c*-2 may illustrate the different frequency hopping patterns used for a long PUCCH 405-*c* of a first size based on the number of UCI bits in a UCI message. Frequency hopping pattern 400-*c*-1 may include a first a first frequency hop 430-*c* during first subset of symbol periods 410-*c* that use first frequency bandwidth 420-*c* and a second frequency hop 435-*c* during second subset of symbol periods 415-*c* that uses second frequency bandwidth 425-*c*. Frequency hopping pattern 400-*c*-1 may include a first a first frequency hop 450-*c* during first subset of symbol periods 440-*c* that use first frequency bandwidth 420-*c* and a second frequency hop 455-*c* during second subset of symbol periods 445-*c* that uses second frequency bandwidth 425-*c*.

In some examples, a UE or base station may identify that the number of UCI bits is less than or equal to two bits and determine that frequency hopping pattern 400-*c*-1 is used for long PUCCH 405-*c*. In some cases, the device identifies frequency hopping pattern 400-*c*-1 using equation set 1. For example, the device determines that the number of symbols in long PUCCH 405-*c*, N, is 9 and divides the number of symbols in long PUCCH 405-*c* by 4 to yield the integer, M, equal to 2 with a remainder of 1. The device may then determine that the number of symbols, or symbol periods in first subset of symbol periods 410-*c*, for first frequency hop 430-*c* equals 2*M=4 symbol periods and the number of symbols, or symbol periods in second subset of symbol periods 415-*c*, for second frequency hop 435-*c* equals 2*M+1=5 symbol periods. As depicted in FIG. 4C, the reference symbol density of first frequency hop 430-*c* is 50% and the reference symbol density of second frequency hop 435-*c* is 40%.

In some examples, a UE or base station may identify that the number of UCI bits is more than two bits and determine that frequency hopping pattern 400-*c*-2 is used for long PUCCH 405-*c*. In some cases, the device identifies frequency hopping pattern 400-*c*-2 using equation set 2. For example, the device determines that the number of symbols in long PUCCH 405-*c*, N, is 9 and determines that the number of symbols, or symbol periods in first subset of symbol periods 410-*c*, for first frequency hop 430-*c* is floor(N/2)=4 and the number of symbols, or symbol periods in second subset of symbol periods 415-*c*, for second frequency hop 435-*c* is (N−floor(N/2))=5. As depicted in FIG. 4C, the reference symbol density of first frequency hop 450-*c* is 25% and the reference symbol density of second frequency hop 455-*c* is 20%. In some cases, the UE or base station determines that each frequency hop includes one reference symbol based on a number of UCI bits conveyed in the UCI message—e.g., for UCI bits>10. In some cases, a different reference/information symbol pattern is used for the frequency hops than that depicted in FIG. 4C. For example, the UE or base station may determine that each frequency hop includes two reference symbols based on a number of UCI bits conveyed in the UCI message—e.g., for 3≤UCI bits≥10. Thus, first frequency hop 450-*c* may be represented as {URUR} with a reference symbol density of 50%, and second frequency hop 455-*c* may be represented as {URURU} with a reference symbol density of 40%.

Figure 5:
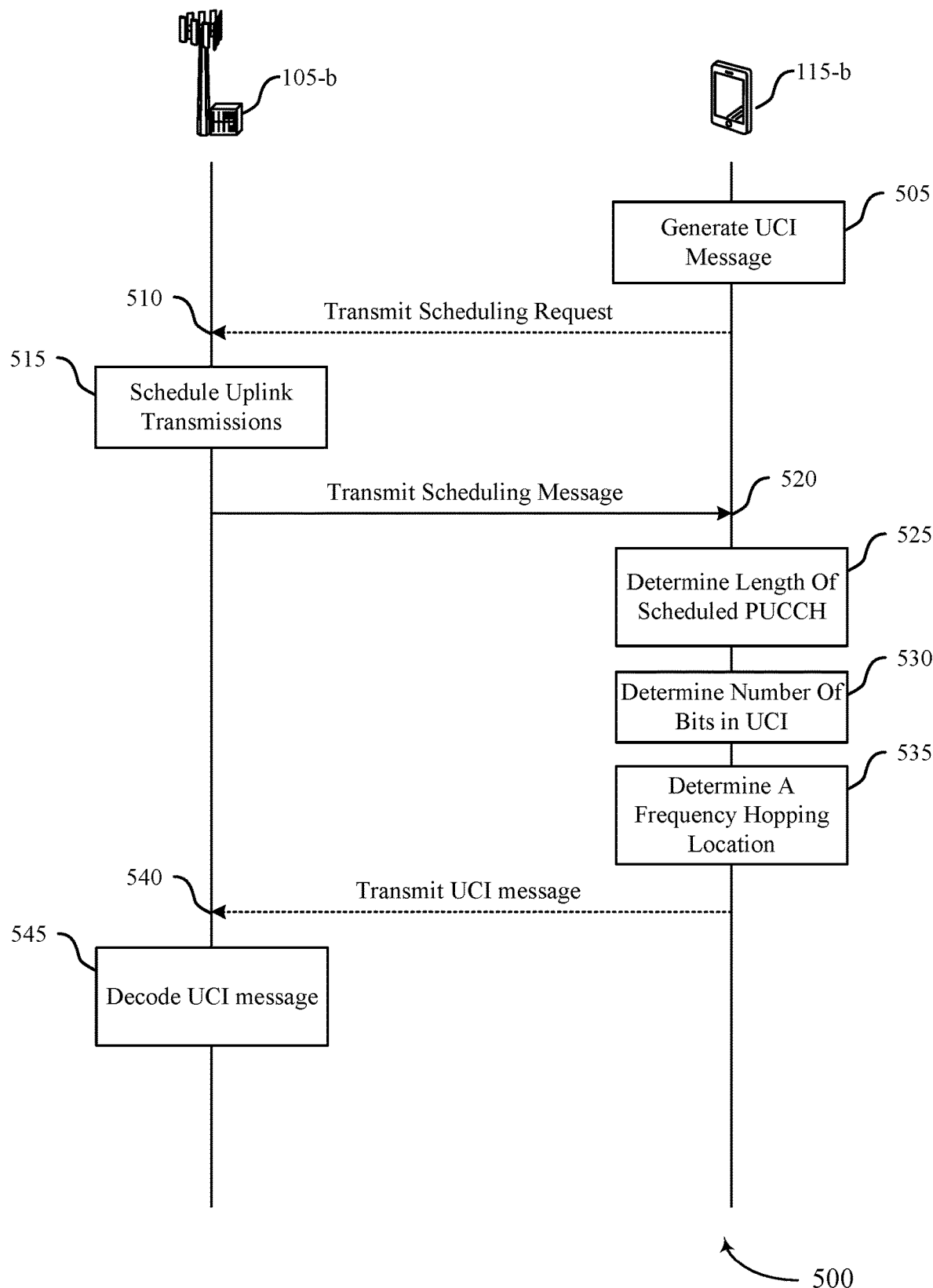
FIGS. 5 and 6 illustrate example process flows for frequency hopping in an uplink control channel in accordance with various aspects of the present disclosure.

FIG. 5 illustrates an example of a process flow 500 for frequency hopping in an uplink control channel in accordance with various aspects of the present disclosure. Process flow 500 may be performed by UE 115-*b* and base station 105-*b*, which may be an example of a UE 115 and base station 105 described above with reference to FIGS. 1-2. In some examples, UE 115-*b* may determine a frequency hopping pattern for an uplink transmission based on a length of an uplink control channel and a number of bits used to represent UCI.

At step 505, UE 115-*b* may generate a UCI message. A UCI message may include one or more information symbols and one or more reference symbols. The information symbols communicate control information such as bits of a UCI message. The reference symbols may be used by base station 105-*b* when decoding the received information symbols. For instance, base station 105-*b* may use the reference symbols as a reference for obtaining a channel estimate. In some cases, UE 115-*b* generates a UCI message after receiving an allocation of PUCCH resources—e.g., based on receiving PUCCH resources of a certain format.

At step 510, UE 115-*b* may optionally transmit a scheduling request to base station 105-*b*. A scheduling request may request that base station 105-*b* reserve uplink resources for an uplink transmission from UE 115-*b*. In some cases, UE 115-*b* is periodically, or semi-periodically, scheduled resources and UE 115-*b* refrains from transmitting a scheduling request.

At step 515, base station 105-*b* may schedule UE 115-*b* for an uplink transmission. In some cases, base station 105-*b* schedules UE 115-*b* for an uplink transmission based on receiving a scheduling request. In other cases, base station 105-*b* schedules UE 115-*b* based on the UE 115-*b* being scheduled on a periodic basis. In some examples, scheduling UE 115-*b* for uplink transmissions includes reserving uplink resources for UE 115-*b* in a control and/or data channel. Base station 105-*b* may also generate DCI indicating which resources have been scheduled and whether frequency hopping has been enabled. In some cases, base station 105-*b* enables frequency hopping by setting a frequency hopping flag in the DCI to a logic 1. In some examples, base station 105-*b* reserves uplink control resources for UE 115-*b* using PUCCH resources that are located in an area of the PUCCH assigned to certain PUCCH formats.

At step 520, base station 105-*b* may transmit a scheduling message to UE 115-*b*. The scheduling message may include DCI, which may indicate resources in an uplink control channel that are reserved for UE 115-*b*. In some cases, a frequency hopping flag is set in the DCI directing, or requesting, UE 115-*b* to perform frequency hopping during the scheduled uplink transmission.

At step 525, UE 115-*b* may determine the length of the uplink control channel, which may range from 4 to 14 symbols. In some cases, a frequency hopping pattern used by UE 115-*b* may be based on the length of the uplink control channel.

At step 530, UE 115-*b* may determine the number of UCI bits conveyed in the generated UCI message. In some cases, the number of UCI bits can range from 0 to 21 bits—e.g., based on whether HARQ feedback or CQI is sent. In some examples, UE 115-*b* may determine that the number of UCI bits is below a threshold (e.g., a threshold of 2 bits). In some examples, UE 115-*b* may determine that the number of UCI bits is above a threshold (e.g., a threshold of 2 bits or a threshold of 10 bits). In some examples, UE 115-*b* may determine that the number of UCI bits is between a threshold and another threshold (e.g., >2 bits and <10 bits).

At step 535, UE 115-*b* may determine a frequency hopping location for the scheduled uplink transmission based on the length of the uplink channel and the number of UCI bits. The frequency hopping pattern used by UE 115-*b* may include a first set of symbols in a first frequency bandwidth (or "a first frequency hop") and, starting at the frequency hopping location, a second set of symbols in a second frequency bandwidth (or "a second frequency hop"). As discussed in FIGS. 2 through 4C, the frequency hopping location may be determined differently if the number of UCI bits is less than or equal to two than if the number of UCI bits is greater than two. For instance, if the number of UCI bits is less than or equal to two, then a desired reference symbol density may be taken into account when constructing the frequency hopping pattern. Moreover, the frequency hopping location may be determined differently for varying lengths of an uplink control channel. In some cases, UE 115-*b* determines the frequency hopping location based on receiving an indication from base station 105-*b* that frequency hopping is to be used. In some cases, UE 115-*b* determines the frequency hopping location based on identifying frequency-specific interference or a change in channel conditions.

In some cases, determining the frequency hopping location includes identifying a frequency hopping location that splits the PUCCH resources into a first frequency hop and a second frequency hop as evenly as possible—e.g., within a period of one another—for any number of UCI bits. In some examples, UE 115-*b* uses equation set 2 to split the PUCCH resources. In some cases, the frequency hopping location is determined based on a number of UCI bits and a relationship between information and reference symbols in a UCI message. In some examples, UE 115-*b* may calculate a frequency hopping location using equation set 1 to partition the PUCCH resources so that a desired reference symbol density is obtained in at least one frequency hop when the number of UCI bits is less than a threshold. In some examples, UE 115-*b* may identify a frequency hopping location using equation set 2 to partition the PUCCH resources when the number of UCI bits is more than a threshold.

At step 540, UE 115-*b* may transmit the UCI message to base station 105-*b* over the first frequency hop and the second frequency hop based on the determined frequency hopping location. In some cases, UE 115-*b* indicates to base station 105-*b* that frequency hopping was used for the scheduled uplink transmission.

At step 545, base station 105-*b* may decode the received UCI message. Decoding the UCI message may include processing the symbols received over the first frequency hop and processing the symbols received over the second frequency hop. In some cases, base station 105-*b* uses the reference symbols received in the UCI message to facilitate decoding the information symbols received in the UCI message. In some examples, base station 105-*b* determines UE 115-*b* used frequency hopping—e.g., by setting the frequency hopping flag in DCI or receiving an indication that frequency hopping was used from UE 115-*b*—and determines which frequency hopping pattern was used based on the length of the scheduled PUCCH and the format of the scheduled PUCCH. For instance, if base station 105-*b* scheduled uplink resources for UE 115-*b* in a location of the PUCCH assigned to PUCCH format 1a, base station 105-*b* may expect UE 115-*b* to generate UCI with less than 2 bits. In another instance, if base station 105-*b* schedules uplink resources for UE 115-*b* in a location of the PUCCH assigned to PUCCH format 2, base station 105-*b* may expect UE 115-*b* to generate UCI with more than 2 bits. Base station 105-*b* may also expect UE 115-*b* to generate a UCI message with a certain number of bits based on a CSI reporting schedule or HARQ feedback schedule. Thus, base station 105-*b* may identify the same frequency hopping location as used by UE 115-*b* based on knowing the length of the PUCCH and determining the number of bits in the UCI.

Figure 6:
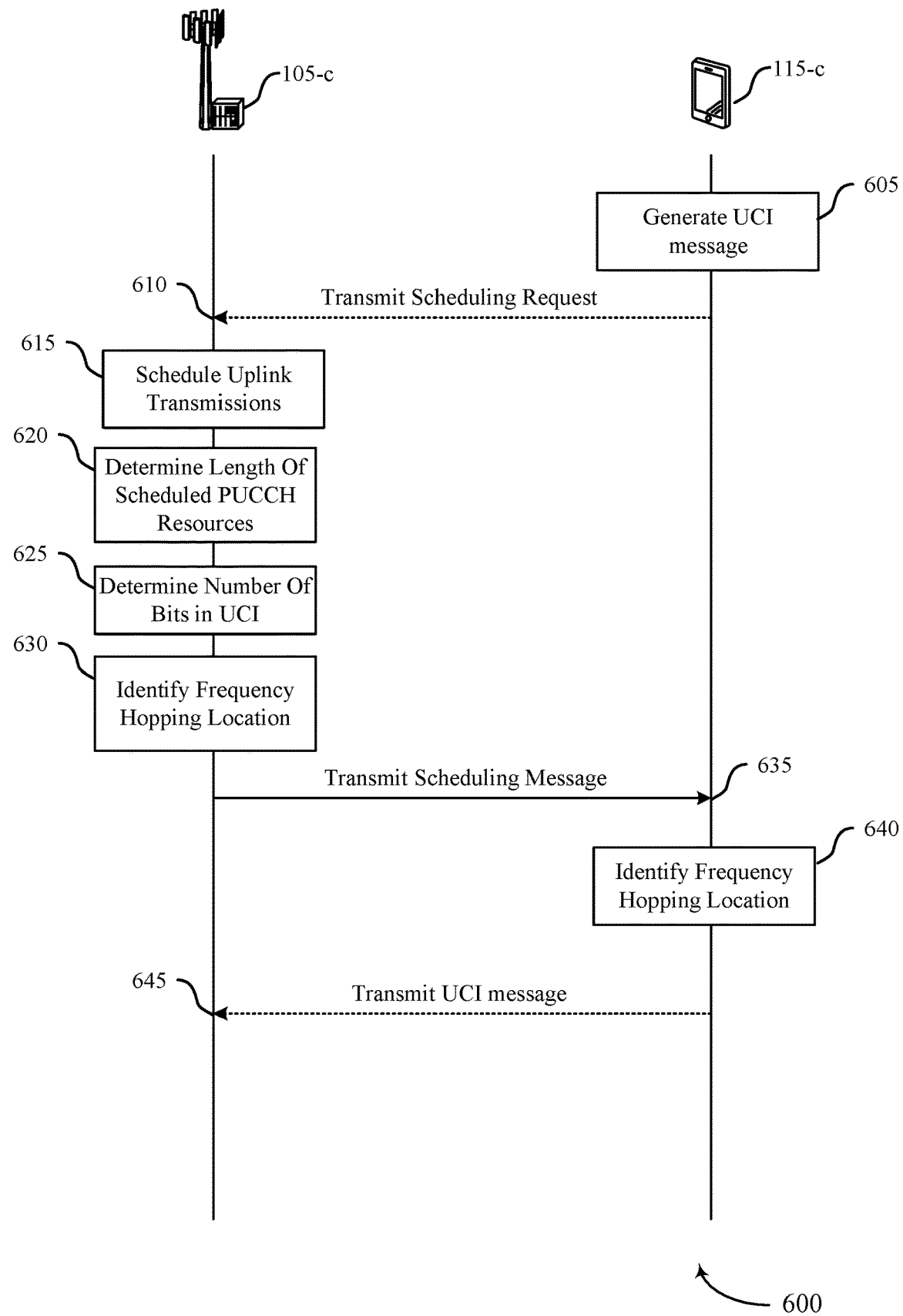

FIG. 6 illustrates an example of a process flow 600 for frequency hopping in an uplink control channel in accordance with various aspects of the present disclosure. Process flow 600 may be performed by UE 115-*c* and base station 105-*c*, which may be an example of a UE 115 and base station 105 described above with reference to FIGS. 1-2. In some examples, base station 105-*c* may determine a frequency hopping pattern for an uplink transmission based on a length of an uplink control channel and a number of bits used to represent UCI.

At step 605 and 610, UE 115-*c* may generate a UCI message and transmit a scheduling request as discussed above in steps 505 and 510 of FIG. 5.

At step 615, base station 105-*c* may schedule UE 115-*c* for an uplink transmission. In some cases, base station 105-*c* schedules UE 115-*c* for an uplink transmission based on receiving a scheduling request. In other cases, base station 105-*c* schedules UE 115-*c* based on the UE 115-*c* being scheduled on a periodic basis. In some examples, scheduling UE 115-*c* for uplink transmissions includes reserving uplink resources for UE 115-*c* in a control and/or data channel. Base station 105-*c* may also generate DCI indicating which resources have been scheduled and whether frequency hopping has been enabled. In some cases, base station 105-*c* enables frequency hopping by setting a frequency hopping flag in the DCI to a logic 1. In some examples, base station 105-*c* reserves uplink control resources for UE 115-*c* using PUCCH resources that are located in an area of the PUCCH assigned to certain PUCCH formats.

At step 620, base station 105-*c* may determine the length of the uplink control channel scheduled for UE 115-*c*, which may range from 4 to 14 symbols. In some cases, a frequency hopping pattern indicated by base station 105-*c* may be based on the length of the uplink control channel.

At step 625, base station 105-*c* may determine the number of UCI bits that will be conveyed in the generated UCI message. In some cases, the number of UCI bits can range from 0 to 21 bits—e.g., based on whether HARQ feedback or CQI is sent. In some cases, base station 105-*c* determines the number of UCI bits that will be transmitted based on the format of the scheduled uplink control channel. For instance, if base station 105-*c* schedules a PUCCH with format 1a, then base station 105-*c* may expect UE 115-*c* to transmit a UCI message conveying one UCI bit.

At step 630, base station 105-*c* may determine a frequency hopping location for the scheduled uplink transmission based on the length of the uplink channel and the number of UCI bits. The frequency hopping pattern determined by base station 105-*c* may include a first set of symbols in a first frequency bandwidth (or "a first frequency hop") and, starting at the frequency hopping location, a second set of symbols in a second frequency bandwidth (or "a second frequency hop"). As discussed in FIGS. 2 through 4C, the frequency hopping location may be determined differently if the number of UCI bits is less than or equal to two than if the number of UCI bits is greater than two. For instance, if the number of UCI bits is less than or equal to two, then a desired reference symbol density may be taken into account when constructing the frequency hopping pattern. Moreover, the frequency hopping location may be determined differently for varying lengths of an uplink control channel.

In some cases, determining the frequency hopping location includes identifying a frequency hopping location that splits the PUCCH resources into a first frequency hop and a second frequency hop as evenly as possible—e.g., within a period of one another—for any number of UCI bits. In some examples, base station 105-c uses equation set 2 to split the PUCCH resources. In some cases, the frequency hopping location is determined based on a number of UCI bits and a relationship between information and reference symbols in a UCI message. In some examples, base station 105-c may calculate a frequency hopping location using equation set 1 to partition the PUCCH resources so that a desired reference symbol density is obtained in at least one frequency hop when the number of UCI bits is less than a threshold. In some examples, base station 105-c may identifying a frequency hopping location using equation set 2 to partition the PUCCH resources when the number of UCI bits is more than a threshold.

At step 635, base station 105-c may transmit the scheduling message to UE 115-c. The scheduling message may include an uplink resource allocation and a frequency hopping flag that is set. In some cases, the scheduling message with the frequency hopping flag set indicates to UE 115-c that the allocated uplink resources are split between two or more frequencies.

At step 640, UE 115-c may identify the frequency hopping location. In some cases, UE 115-c may identify the frequency hopping location based on the received resource allocation, the frequency hopping flag, the length of the PUCCH, and/or a format of the PUCCH, which may correspond to a number of UCI bits conveyed in the generated UCI message. For example, UE 115-c may identify a frequency hopping location that corresponds to a frequency hopping pattern with a first frequency hop during a first set of symbol periods and a second frequency hop during a second set of symbols periods based on receiving a frequency hopping enabled flag, the length of the PUCCH, and a location of the PUCCH resources in the PUCCH.

At step 645, UE 115-c may transmit the UCI message to base station 105-c over the first frequency hop during a first subset of symbol periods and the second frequency hop during a second subset of symbol periods based on the identified frequency hopping location.

Figure 7:
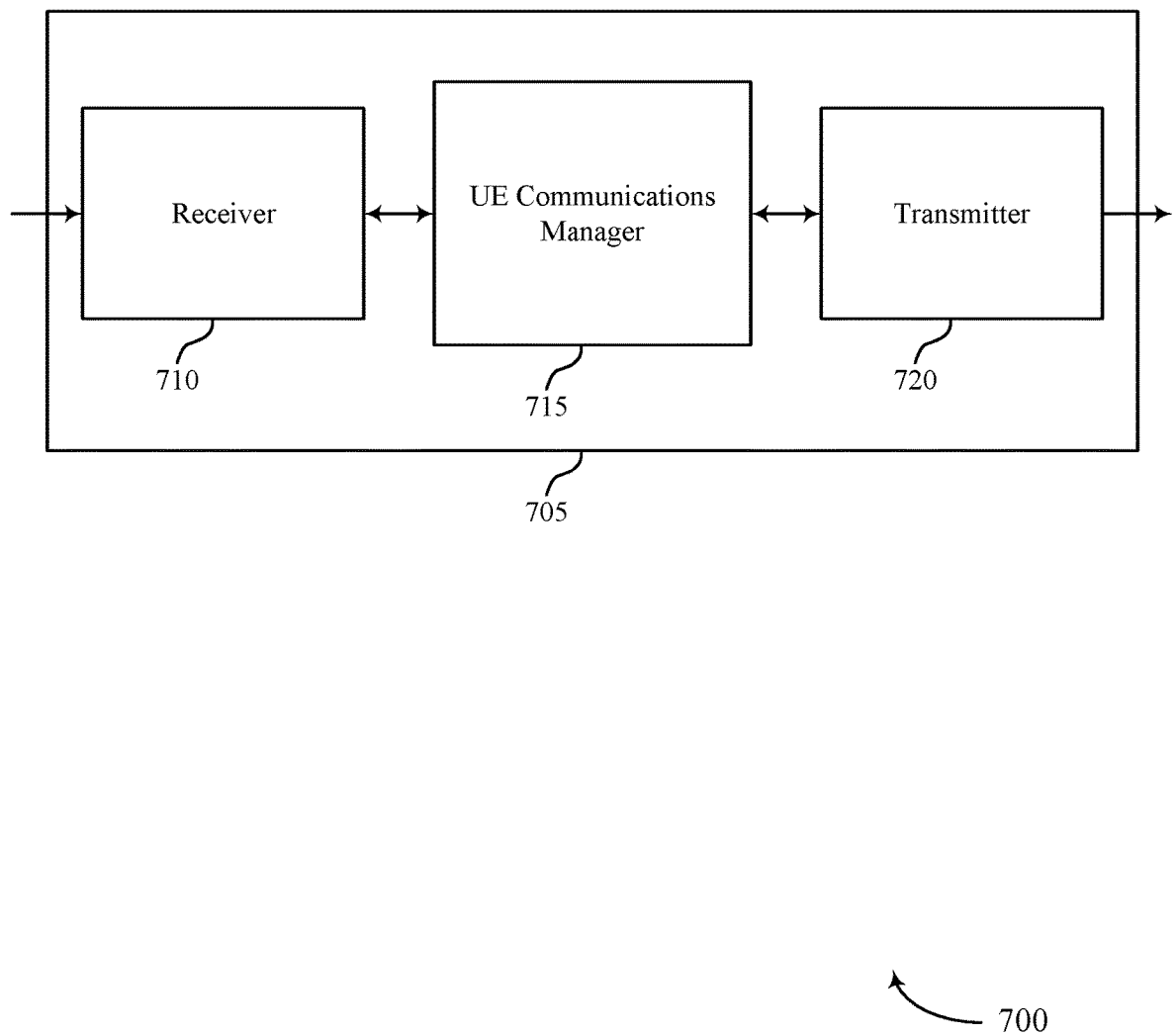
FIGS. 7 and 8 show block diagrams of a device that supports frequency hopping in an uplink control channel in accordance with aspects of the present disclosure.

FIG. 7 shows a block diagram 700 of a wireless device 705 that supports frequency hopping in an uplink control channel in accordance with aspects of the present disclosure. Wireless device 705 may be an example of aspects of a user equipment (UE) 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to frequency hopping in an uplink control channel, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may identify a number of symbols of an uplink control channel and determine a frequency hopping position within the uplink control channel for transmitting an uplink control message based on the number of symbols of the uplink control channel and a number of information bits associated with the uplink control message.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Transmitter 720 may transmit the uplink control message over a first frequency bandwidth during a first subset of symbols and over a second frequency bandwidth during a second subset of symbols according to the frequency hopping position.

Figure 8:
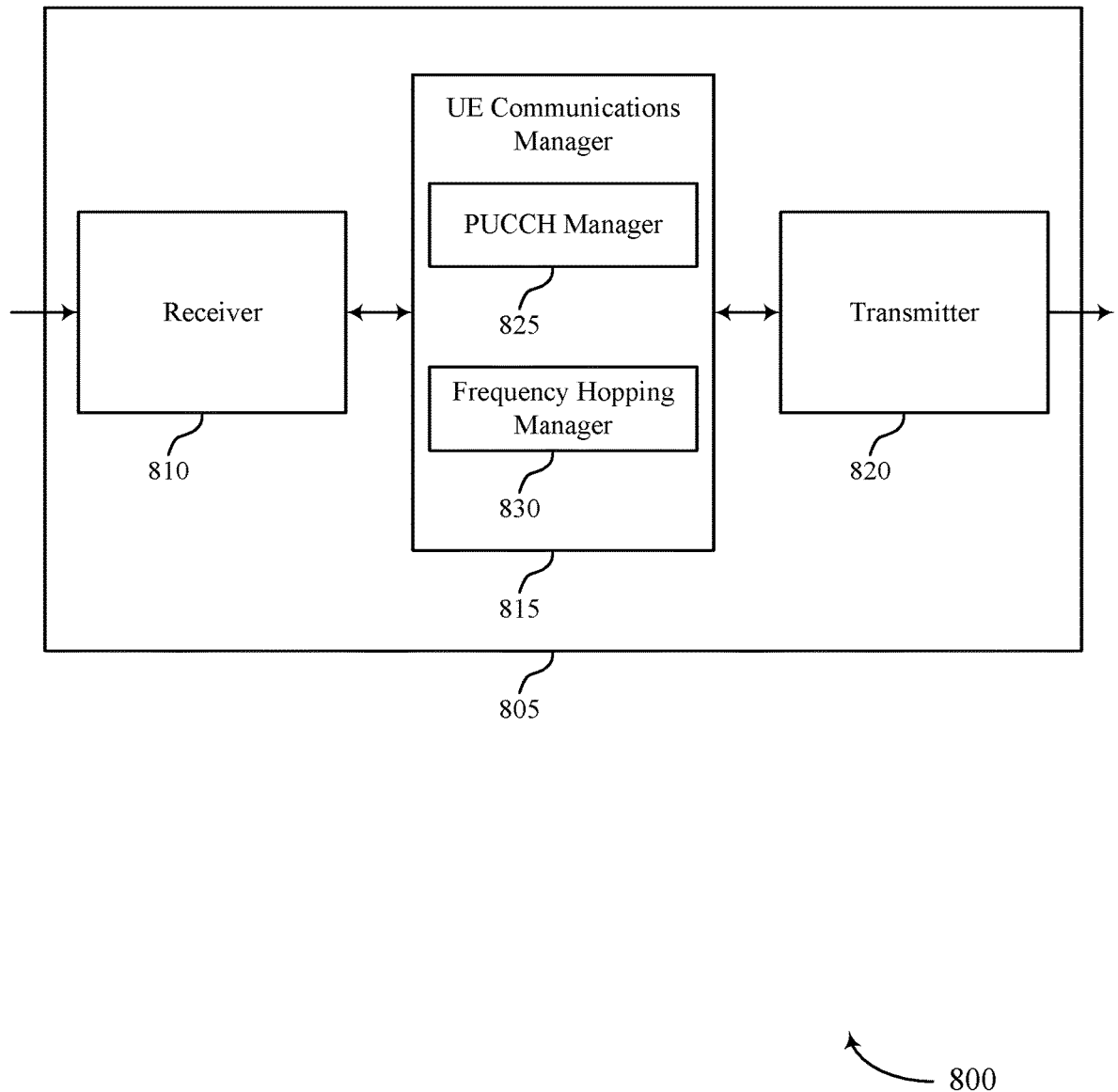

FIG. 8 shows a block diagram 800 of a wireless device 805 that supports frequency hopping in an uplink control channel in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to frequency hopping in an uplink control channel, etc.). Information may be passed on to other components of the device. The receiver 810 may be an example of aspects of the transceiver 935 described with reference to FIG. 9. The receiver 810 may utilize a single antenna or a set of antennas.

UE communications manager 815 may be an example of aspects of the UE communications manager 915 described with reference to FIG. 9. UE communications manager 815 may also include physical uplink control channel (PUCCH) manager 825 and frequency hopping manager 830.

PUCCH manager 825 may identify a number of symbols of an uplink control channel. PUCCH manager 825 may also receive an uplink grant that allocates the number of symbols to the UE. PUCCH manager 825 may also identify the number of information bits in an uplink control message based on a format of the uplink control channel. In some cases, the uplink control message includes one or more information symbols and one or more reference symbols that alternate with one another in time.

Frequency hopping manager 830 may receive an indication to use frequency hopping for transmissions over the uplink control channel. Frequency hopping manager 830 may also determine a frequency hopping position within the uplink control channel for transmitting an uplink control message based on the number of symbols of the uplink control channel and a number of information bits associated with the uplink control message. For instance, frequency hopping manager 830 may determine that the number of information bits associated with the uplink control message is less than or equal to a threshold. In some cases, frequency hopping manager 830 may calculate a duration of the first subset of symbols by taking a floor function of the number of symbols divided by two and calculate a duration of the second subset of symbols by subtracting the duration of the first subset of symbols from the number of symbols.

In some cases, the frequency hopping position is determined based on a relationship between information symbols and reference symbols in the uplink control message. For instance, frequency hopping manager 830 may determine a frequency hopping location so that at least one of the first subset of symbols and the second subset of symbols includes an equal number of information symbols and reference symbols, and an absolute value of a difference between a number of the first subset of symbols and a number of the second subset of symbols is less than or equal to two based on identifying the number of information bits is less than a threshold. For example, frequency hopping manager 830 may determine that dividing the number of symbols by four yields an integer value, calculate a duration of the first subset of symbols by multiplying the integer value by two, and calculate a duration of the second subset of symbols by multiplying the integer value by two. Or frequency hopping manager 830 may determine that dividing the number of symbols by four yields an integer value and a remainder of one and calculate a duration of the second subset of symbols by multiplying the integer value by two and adding one. Or frequency hopping manager 830 may determine that dividing the number of symbols by four yields an integer value and a remainder of two and calculate a duration of the second subset of symbols by multiplying the integer value by two and adding two. Or frequency hopping manager 830 may determine that dividing the number of symbols by four yields an integer value and a remainder of three, calculate a duration of the first subset of symbols by multiplying the integer value by two and adding one, and calculate a duration of the first subset of symbols and a duration of the second subset of symbols.

In another instance, frequency hopping manager 830 may determine that the number of information bits associated with the uplink control message is greater than a threshold. In some cases, frequency hopping manager 830 may calculate a duration of the first subset of symbols and a duration of the second subset of symbols, where an absolute value of a difference between a number of the first subset of symbols and a number of the second subset of symbols is less than or equal to one based on identifying the number of information bits is greater than a threshold. In some cases, frequency hopping manager 830 may calculate a duration of the first subset of symbols by taking a floor function of the number of symbols divided by two and calculate a duration of the second subset of symbols by subtracting the duration of the first subset of symbols from the number of symbols.

Transmitter 820 may transmit signals generated by other components of the device. In some examples, the transmitter 820 may be collocated with a receiver 810 in a transceiver module. For example, the transmitter 820 may be an example of aspects of the transceiver 935 described with reference to FIG. 9. The transmitter 820 may utilize a single antenna or a set of antennas.

Figure 9:
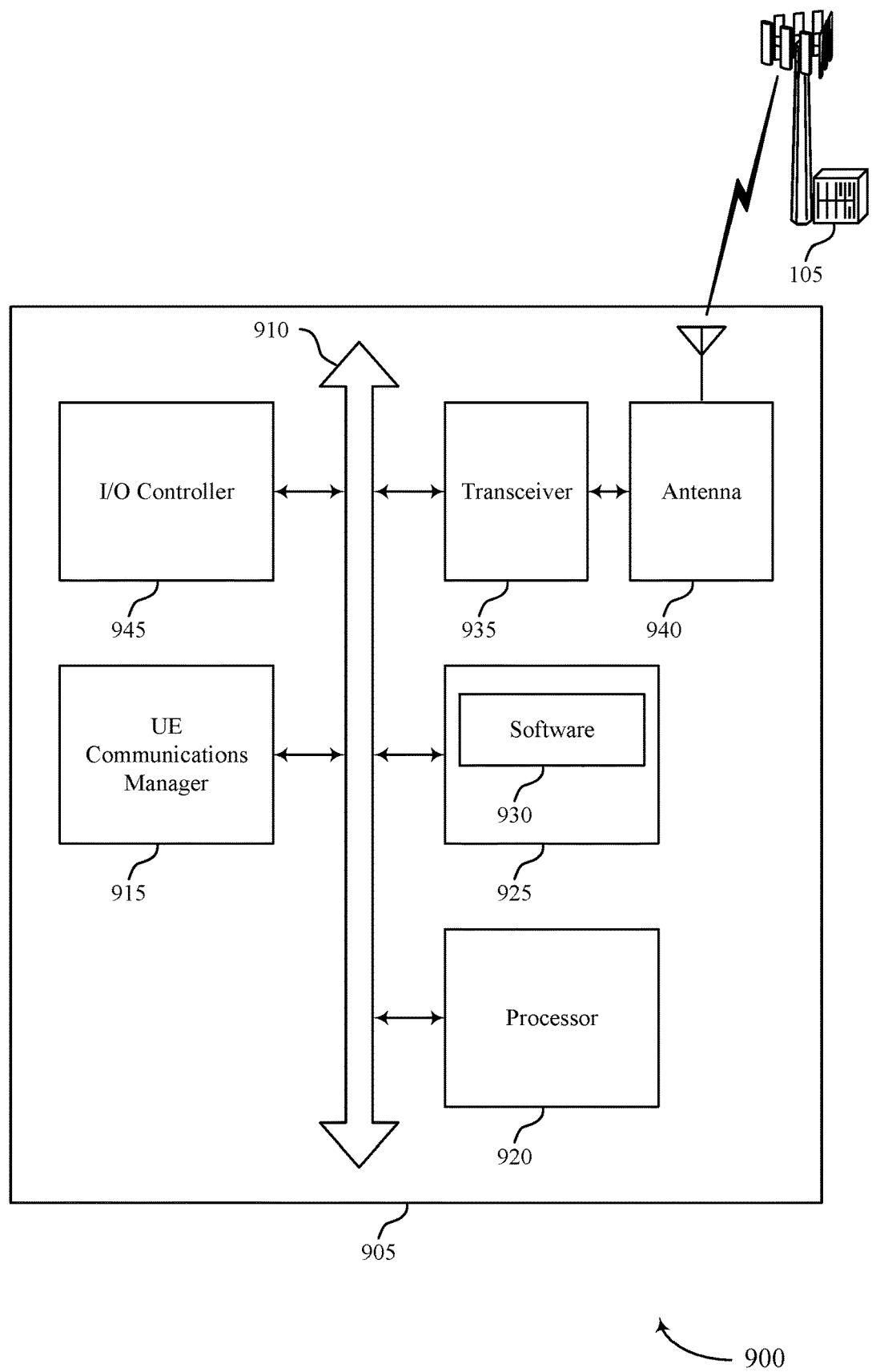
FIG. 9 illustrates a block diagram of a system including a UE that supports frequency hopping in an uplink control channel in accordance with aspects of the present disclosure.

FIG. 9 shows a diagram of a system 900 including a device 905 that supports frequency hopping in an uplink control channel in accordance with aspects of the present disclosure. Device 905 may be an example of or include the components of wireless device 705, wireless device 805, or a UE 115 as described above, e.g., with reference to FIGS. 7 and 8. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting frequency hopping in an uplink control channel).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support frequency hopping in an uplink control channel. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
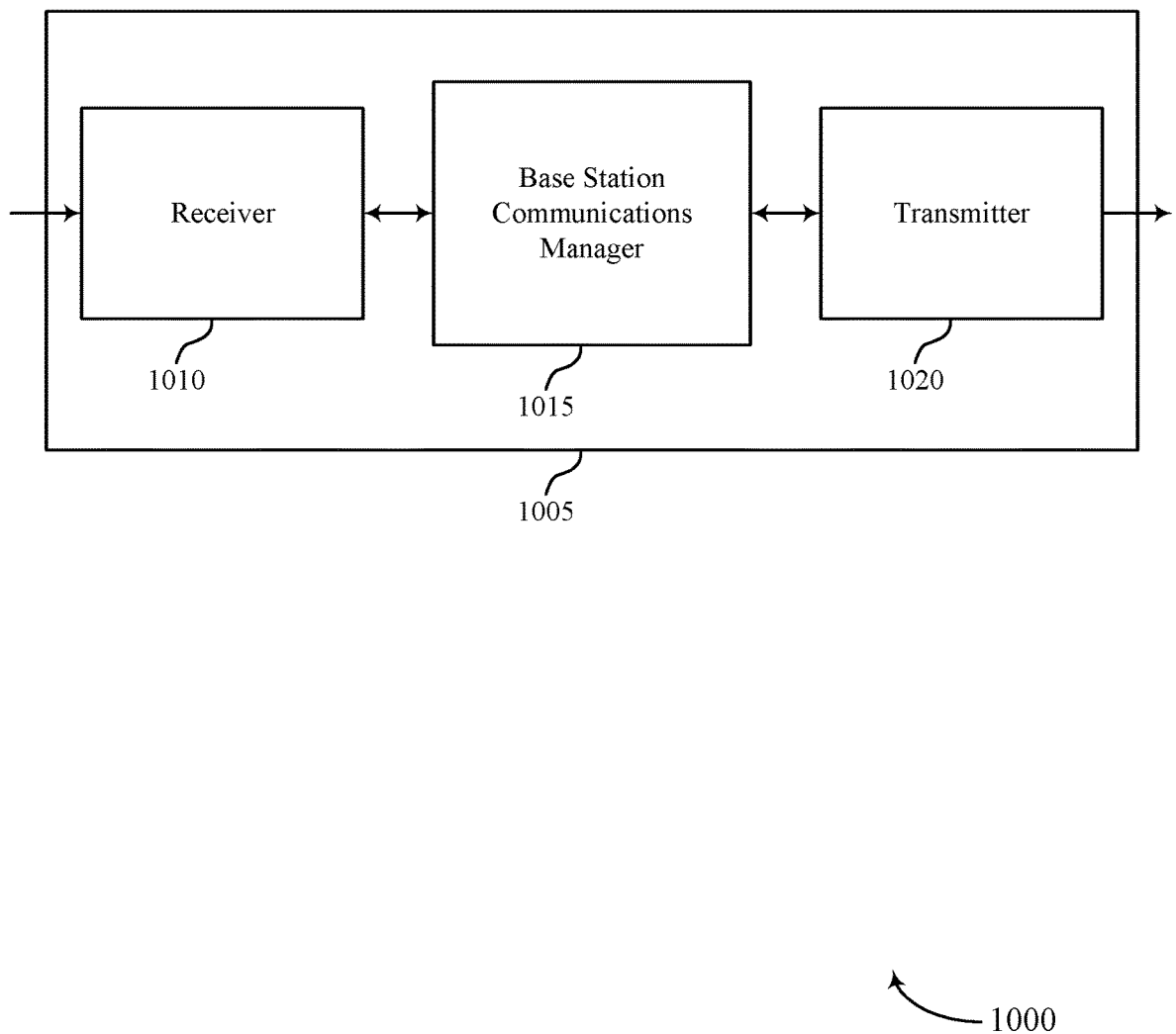
FIGS. 10 and 11 show block diagrams of a device that supports frequency hopping in an uplink control channel in accordance with aspects of the present disclosure.

FIG. 10 shows a block diagram 1000 of a wireless device 1005 that supports frequency hopping in an uplink control channel in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to frequency hopping in an uplink control channel, etc.). Information may be passed on to other components of the device. The receiver 1010 may be an example of aspects of the transceiver 1235 described with reference to FIG. 12. The receiver 1010 may utilize a single antenna or a set of antennas.

Receiver 1010 may receive the uplink control message over a first frequency bandwidth during a first subset of symbols and over a second frequency bandwidth during a second subset of symbols according to the frequency hopping position.

Base station communications manager 1015 may be an example of aspects of the base station communications manager 1215 described with reference to FIG. 12.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a number of symbols of an uplink control channel and determine a frequency hopping position within the uplink control channel for transmitting an uplink control message based on the number of symbols of the uplink control channel and a number of information bits associated with the uplink control message.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
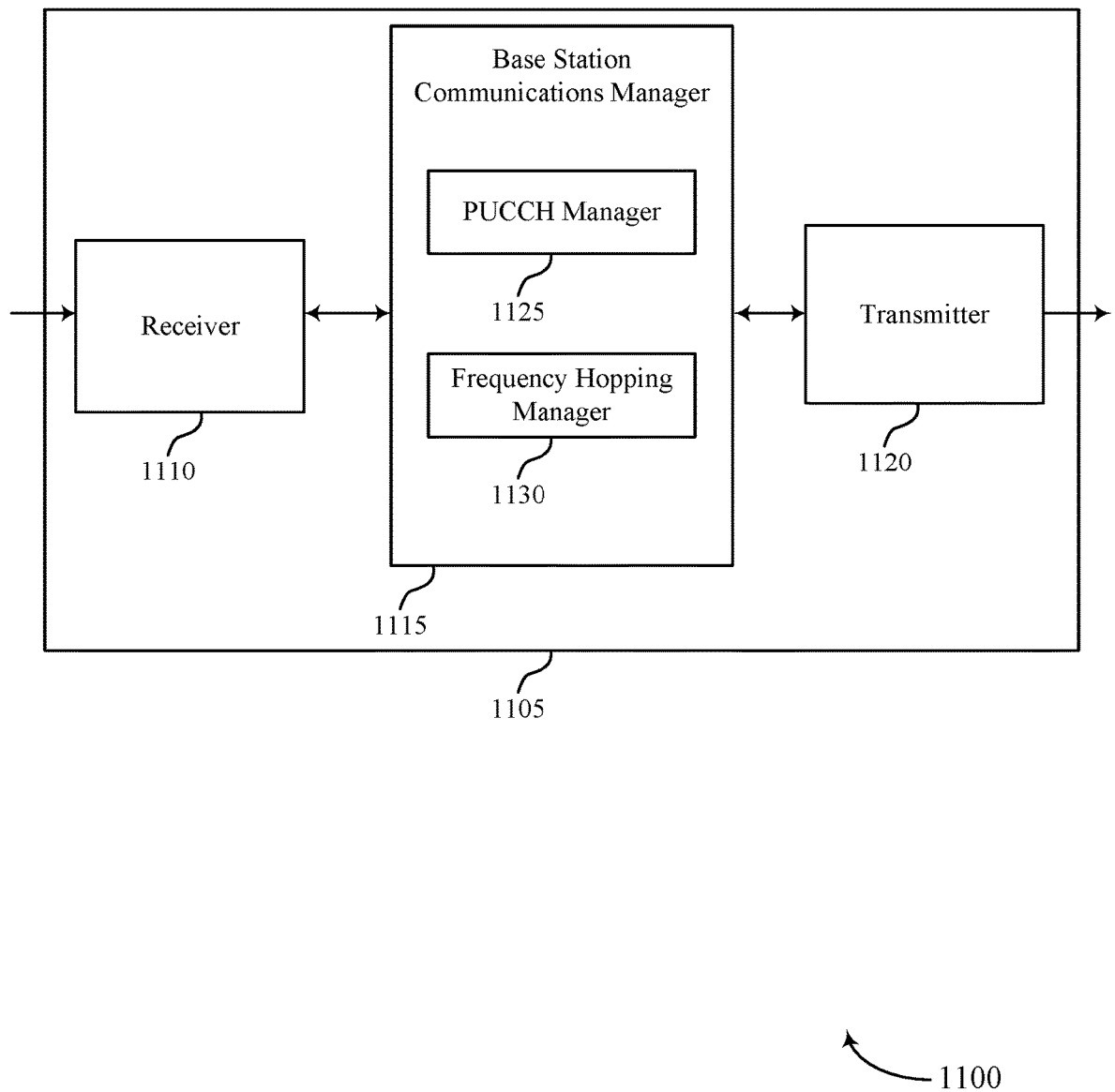

FIG. 11 shows a block diagram 1100 of a wireless device 1105 that supports frequency hopping in an uplink control channel in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to frequency hopping in an uplink control channel, etc.). Information may be passed on to other components of the device. The receiver 1110 may be an example of aspects of the transceiver 1235 described with reference to FIG. 12. The receiver 1110 may utilize a single antenna or a set of antennas.

Base station communications manager 1115 may be an example of aspects of the base station communications manager 1215 described with reference to FIG. 12.

Base station communications manager 1115 may also include PUCCH manager 1125 and frequency hopping manager 1130.

PUCCH manager 1125 may identify a number of symbols of an uplink control channel, transmit an uplink grant that indicates a format of the uplink control channel, where the format of the uplink control channel is associated with the number of information bits in the uplink control message, and transmit an indication to use frequency hopping for transmissions over the uplink control channel.

Frequency hopping manager 1130 may receive an indication to use frequency hopping for transmissions over the uplink control channel. Frequency hopping manager 1130 may also determine a frequency hopping position within the uplink control channel for transmitting an uplink control message based on the number of symbols of the uplink control channel and a number of information bits associated with the uplink control message. For instance, frequency hopping manager 1130 may determine that the number of information bits associated with the uplink control message is less than or equal to a threshold. In some cases, frequency hopping manager 1130 may calculate a duration of the first subset of symbols by taking a floor function of the number of symbols divided by two and calculate a duration of the second subset of symbols by subtracting the duration of the first subset of symbols from the number of symbols.

In some cases, the frequency hopping position is determined based on a relationship between information symbols and reference symbols in the uplink control message. For instance, frequency hopping manager 1130 may determine a frequency hopping location so that at least one of the first subset of symbols and the second subset of symbols includes an equal number of information symbols and reference symbols, and an absolute value of a difference between a number of the first subset of symbols and a number of the second subset of symbols is less than or equal to two based on identifying the number of information bits is less than a threshold. For example, frequency hopping manager 1130 may determine that dividing the number of symbols by four yields an integer value, calculate a duration of the first subset of symbols by multiplying the integer value by two, and calculate a duration of the second subset of symbols by multiplying the integer value by two. Or frequency hopping manager 1130 may determine that dividing the number of symbols by four yields an integer value and a remainder of one and calculate a duration of the second subset of symbols by multiplying the integer value by two and adding one. Or frequency hopping manager 1130 may determine that dividing the number of symbols by four yields an integer value and a remainder of two and calculate a duration of the second subset of symbols by multiplying the integer value by two and adding two. Or frequency hopping manager 1130 may determine that dividing the number of symbols by four yields an integer value and a remainder of three, calculate a duration of the first subset of symbols by multiplying the integer value by two and adding one, and calculate a duration of the first subset of symbols and a duration of the second subset of symbols.

In another instance, frequency hopping manager 1130 may determine that the number of information bits associated with the uplink control message is greater than a threshold. In some cases, frequency hopping manager 1130 may calculate a duration of the first subset of symbols and a duration of the second subset of symbols, where an absolute value of a difference between a number of the first subset of symbols and a number of the second subset of symbols is less than or equal to one based on identifying the number of information bits is greater than a threshold. In some cases, frequency hopping manager 1130 may calculate a duration of the first subset of symbols by taking a floor function of the number of symbols divided by two and calculate a duration of the second subset of symbols by subtracting the duration of the first subset of symbols from the number of symbols.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1235 described with reference to FIG. 12. The transmitter 1120 may utilize a single antenna or a set of antennas.

Figure 12:
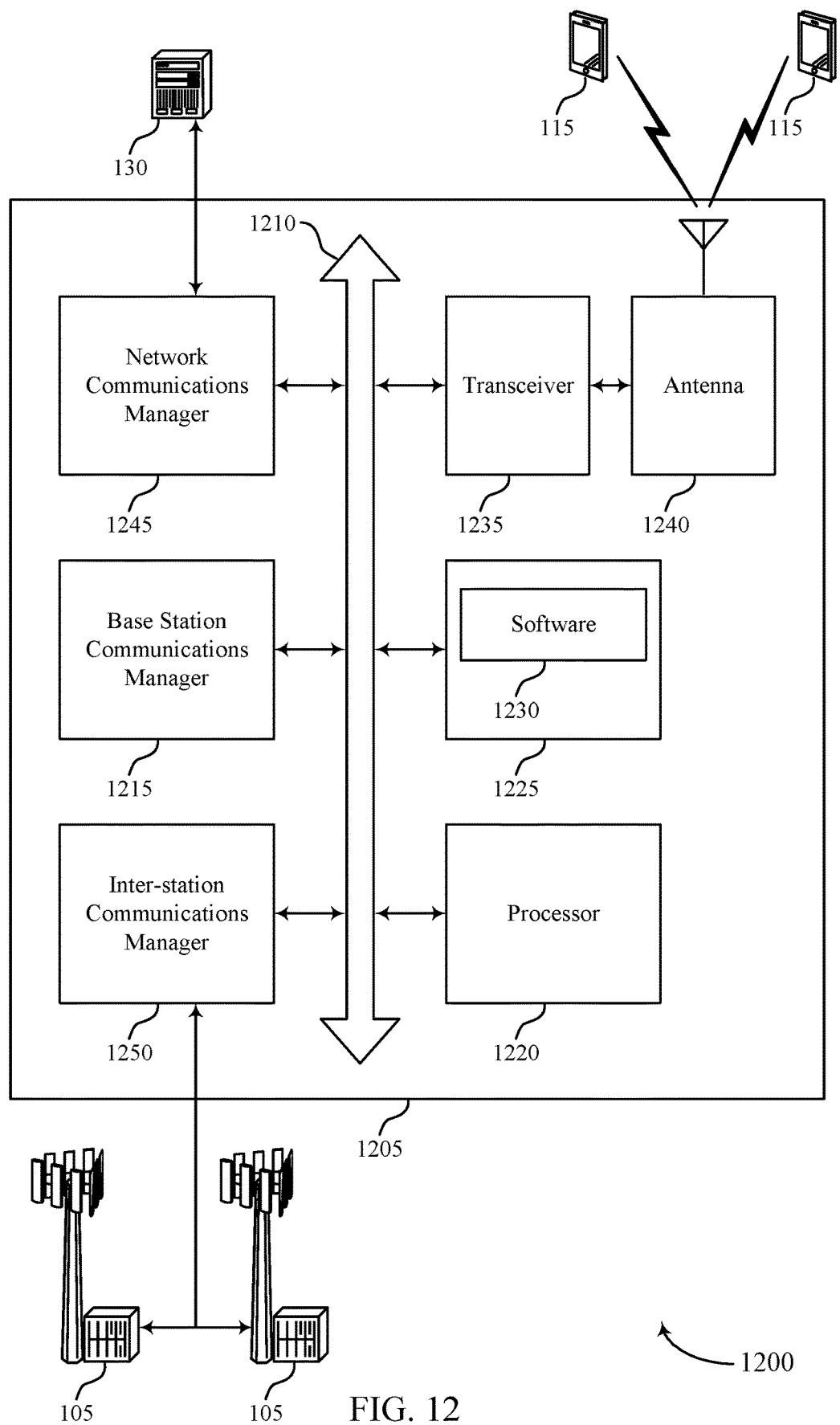
FIG. 12 illustrates a block diagram of a system including a base station that supports frequency hopping in an uplink control channel in accordance with aspects of the present disclosure.

FIG. 12 shows a diagram of a system 1200 including a device 1205 that supports frequency hopping in an uplink control channel in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting frequency hopping in an uplink control channel).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support frequency hopping in an uplink control channel. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105 and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
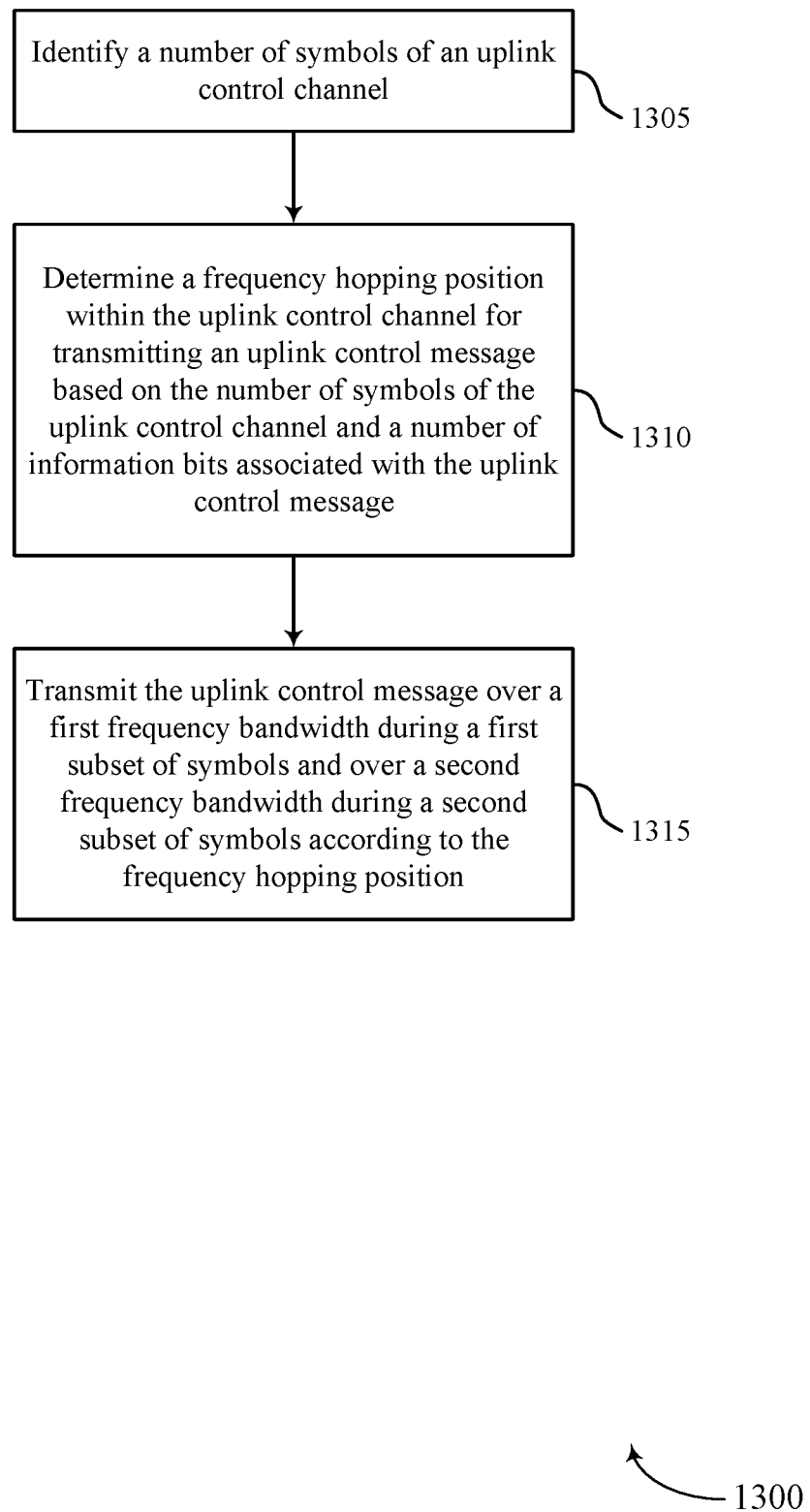
FIGS. 13 through 18 illustrate methods for frequency hopping in an uplink control channel in accordance with aspects of the present disclosure.

FIG. 13 shows a flowchart illustrating a method 1300 for frequency hopping in an uplink control channel in accordance with aspects of the present disclosure. The operations of method 1300 may be implemented by a UE 115 or its components as described herein. For example, the operations of method 1300 may be performed by a UE communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may identify a number of symbols of an uplink control channel. The operations of block 1305 may be performed according to the methods described herein. In certain examples, aspects of the operations of block 1305 may be performed by a PUCCH manager as described with reference to FIGS. 7 through 9.

At block 1310 the UE 115 may determine a frequency hopping position within the uplink control channel for transmitting an uplink control message based at least in part on the number of symbols of the uplink control channel and a number of information bits associated with the uplink control message. The operations of block 1310 may be performed according to the methods described herein. In certain examples, aspects of the operations of block 1310 may be performed by a frequency hopping manager as described with reference to FIGS. 7 through 9.

At block 1315 the UE 115 may transmit the uplink control message over a first frequency bandwidth during a first subset of symbols and over a second frequency bandwidth during a second subset of symbols according to the frequency hopping position. The operations of block 1315 may be performed according to the methods described herein. In certain examples, aspects of the operations of block 1315 may be performed by a transmitter as described with reference to FIGS. 7 through 9.

Figure 14:
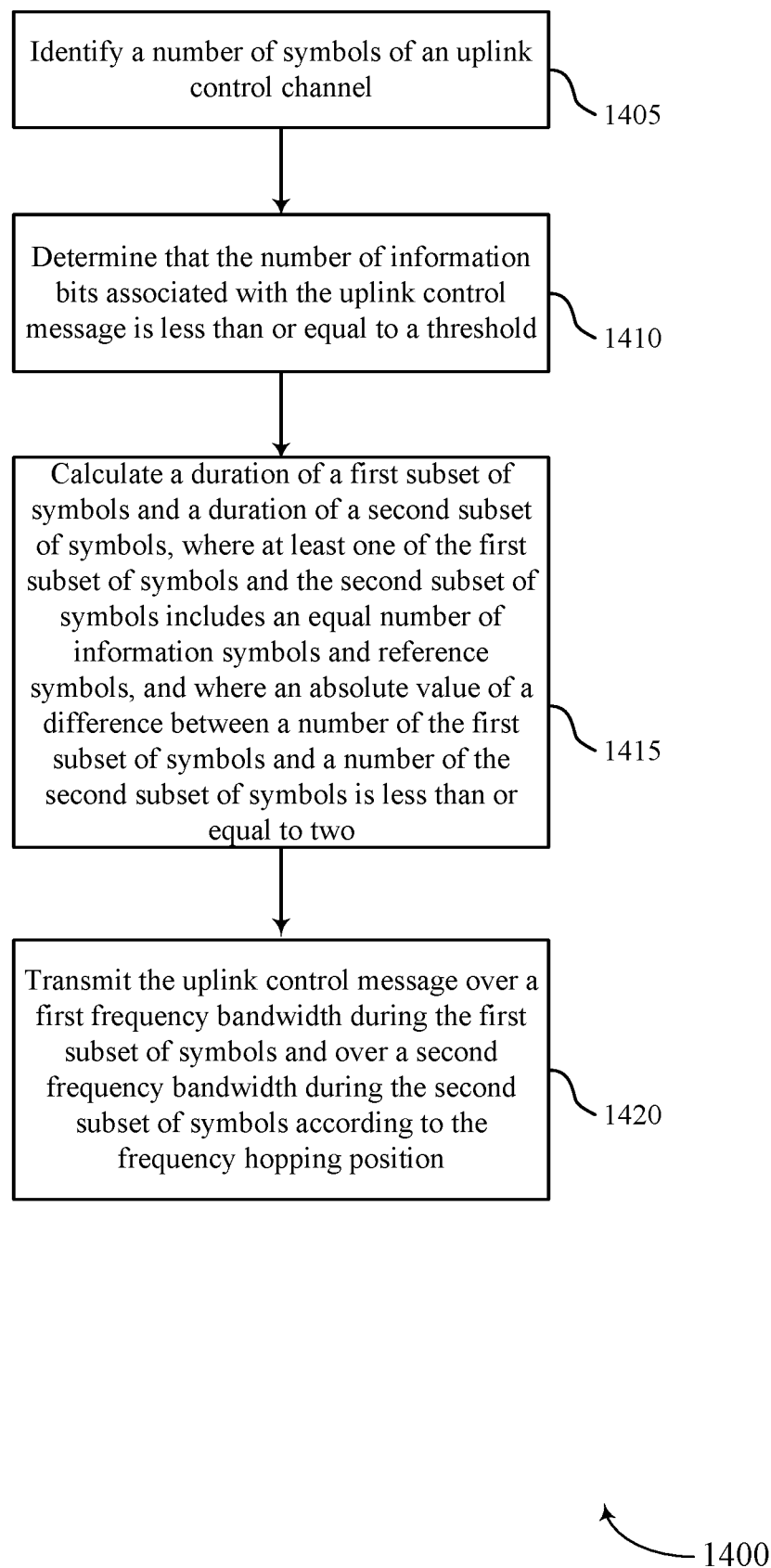

FIG. 14 shows a flowchart illustrating a method 1400 for frequency hopping in an uplink control channel in accordance with aspects of the present disclosure. The operations of method 1400 may be implemented by a UE 115 or its components as described herein. For example, the operations of method 1400 may be performed by a UE communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify a number of symbols of an uplink control channel. The operations of block 1405 may be performed according to the methods described herein. In certain examples, aspects of the operations of block 1405 may be performed by a PUCCH manager as described with reference to FIGS. 7 through 9.

At block 1410 the UE 115 may determine that the number of information bits associated with the uplink control message is less than or equal to a threshold. The operations of block 1410 may be performed according to the methods described herein. In certain examples, aspects of the operations of block 1410 may be performed by a frequency hopping manager as described with reference to FIGS. 7 through 9. In some cases, the uplink control message comprises one or more information symbols and one or more reference symbols that alternate with one another in time. In some cases, a frequency hopping position is determined based at least in part on a relationship between information symbols and reference symbols in the uplink control message.

At block 1415 the UE 115 may calculate a duration of a first subset of symbols and a duration of a second subset of symbols, wherein at least one of the first subset of symbols and the second subset of symbols comprises an equal number of information symbols and reference symbols, and wherein an absolute value of a difference between a number of the first subset of symbols and a number of the second subset of symbols is less than or equal to two. The operations of block 1415 may be performed according to the methods described herein. In certain examples, aspects of the operations of block 1415 may be performed by a frequency hopping manager as described with reference to FIGS. 7 through 9.

At block 1420 the UE 115 may transmit the uplink control message over a first frequency bandwidth during the first subset of symbols and over a second frequency bandwidth during the second subset of symbols according to the frequency hopping position. The operations of block 1420 may be performed according to the methods described herein. In certain examples, aspects of the operations of block 1420 may be performed by a transmitter as described with reference to FIGS. 7 through 9.

Figure 15:
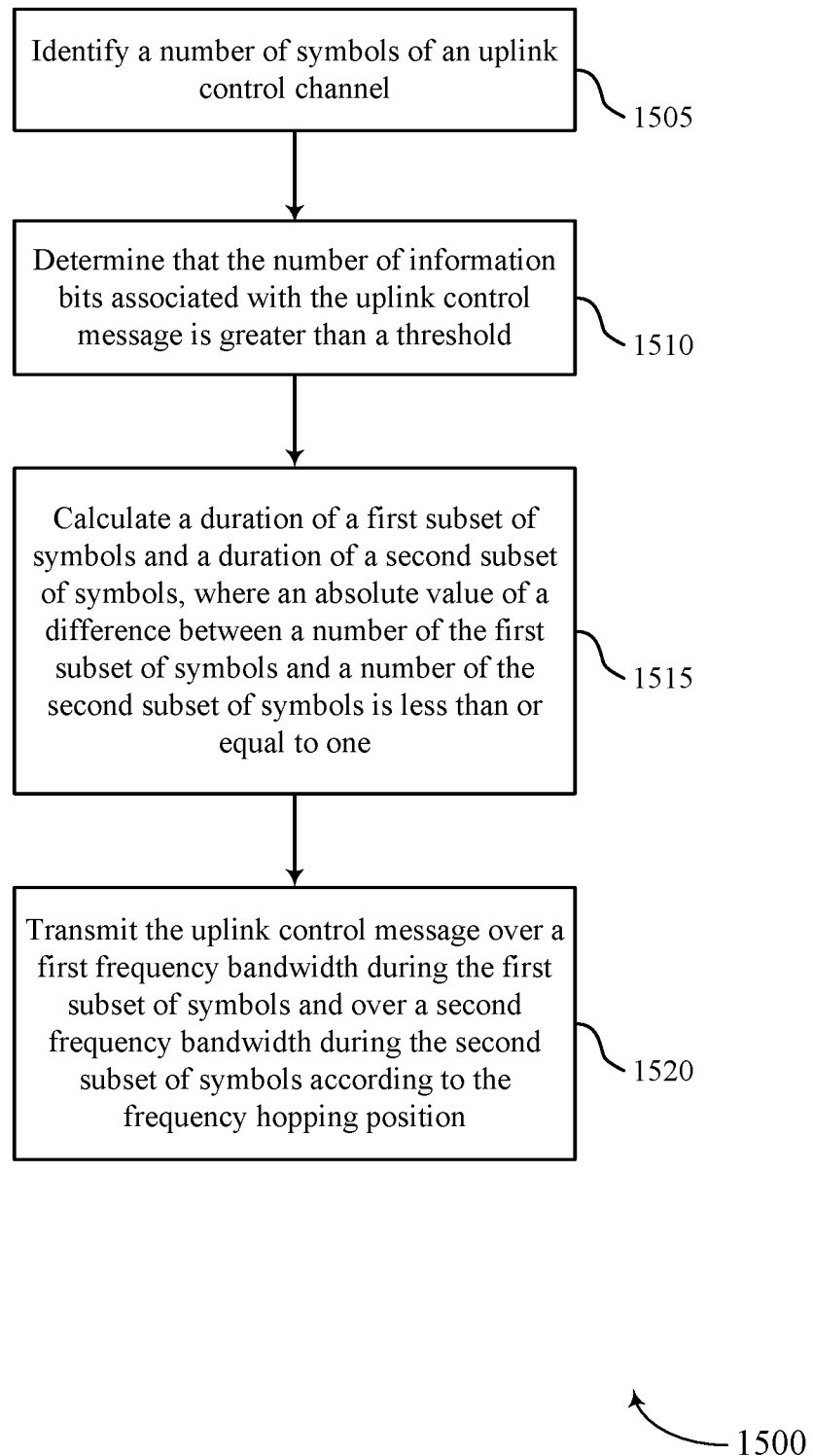

FIG. 15 shows a flowchart illustrating a method 1500 for frequency hopping in an uplink control channel in accordance with aspects of the present disclosure. The operations of method 1500 may be implemented by a UE 115 or its components as described herein. For example, the operations of method 1500 may be performed by a UE communications manager as described with reference to FIGS. 7 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify a number of symbols of an uplink control channel. The operations of block 1505 may be performed according to the methods described herein. In certain examples, aspects of the operations of block 1505 may be performed by a PUCCH manager as described with reference to FIGS. 7 through 9.

At block 1510 the UE 115 may determine that the number of information bits associated with the uplink control message is greater than a threshold. The operations of block 1510 may be performed according to the methods described herein. In certain examples, aspects of the operations of block 1510 may be performed by a frequency hopping manager as described with reference to FIGS. 7 through 9.

At block 1515 the UE 115 may calculate a duration of a first subset of symbols and a duration of a second subset of symbols, wherein an absolute value of a difference between a number of the first subset of symbols and a number of the second subset of symbols is less than or equal to one. The operations of block 1515 may be performed according to the methods described herein. In certain examples, aspects of the operations of block 1515 may be performed by a frequency hopping manager as described with reference to FIGS. 7 through 9.

At block 1520 the UE 115 may transmit the uplink control message over a first frequency bandwidth during the first subset of symbols and over a second frequency bandwidth during the second subset of symbols according to the frequency hopping position. The operations of block 1520 may be performed according to the methods described herein. In certain examples, aspects of the operations of block 1520 may be performed by a transmitter as described with reference to FIGS. 7 through 9.

Figure 16:
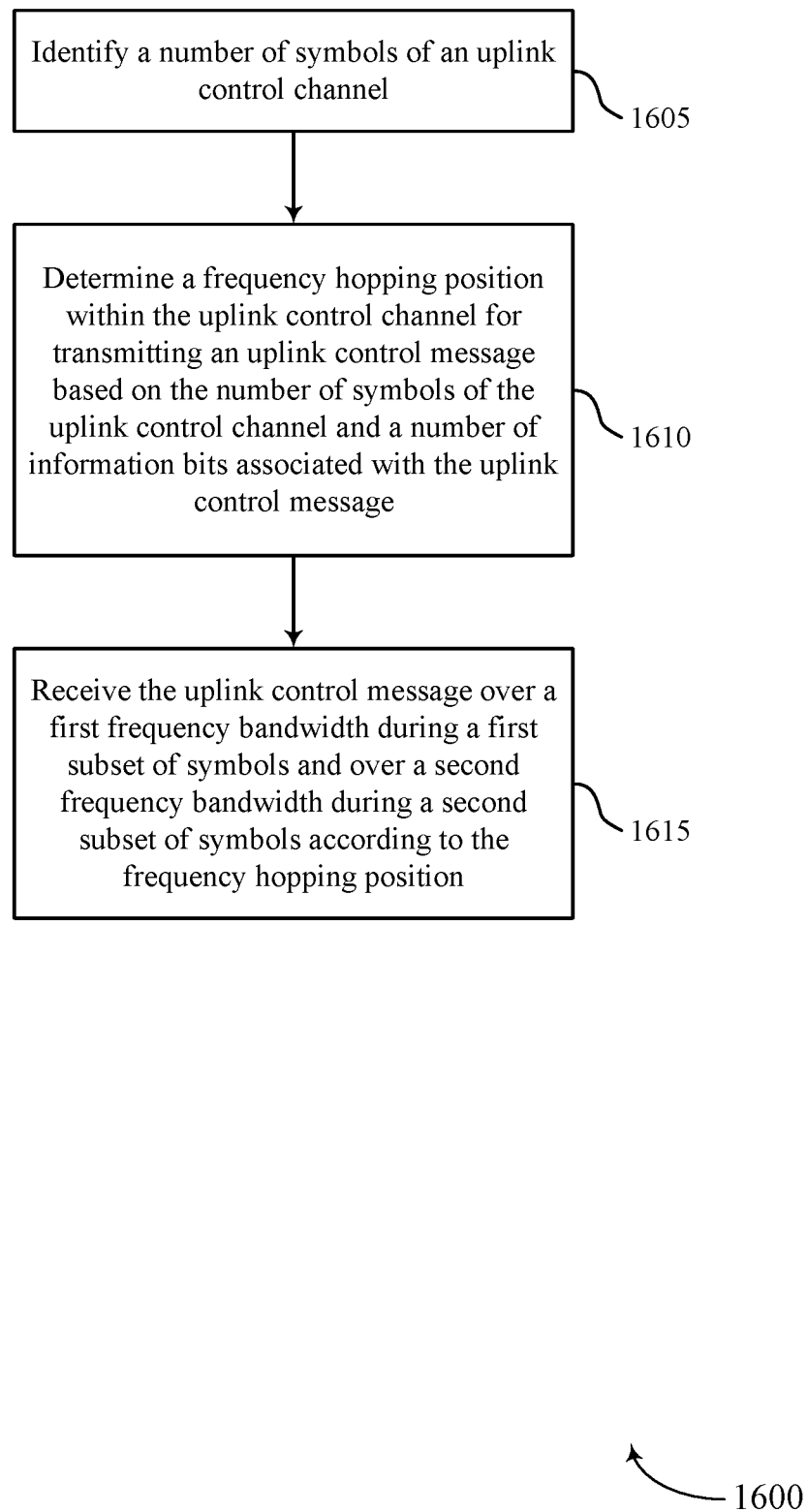

FIG. 16 shows a flowchart illustrating a method 1600 for frequency hopping in an uplink control channel in accordance with aspects of the present disclosure. The operations of method 1600 may be implemented by a base station 105 or its components as described herein. For example, the operations of method 1600 may be performed by a base station communications manager as described with reference to FIGS. 10 through 12. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may identify a number of symbols of an uplink control channel. The operations of block 1605 may be performed according to the methods described herein. In certain examples, aspects of the operations of block 1605 may be performed by a PUCCH manager as described with reference to FIGS. 10 through 12.

At block 1610 the base station 105 may determine a frequency hopping position within the uplink control channel for transmitting an uplink control message based at least in part on the number of symbols of the uplink control channel and a number of information bits associated with the uplink control message. The operations of block 1610 may be performed according to the methods described herein. In certain examples, aspects of the operations of block 1610 may be performed by a frequency hopping manager as described with reference to FIGS. 10 through 12.

At block 1615 the base station 105 may receive the uplink control message over a first frequency bandwidth during a first subset of symbols and over a second frequency bandwidth during a second subset of symbols according to the frequency hopping position. The operations of block 1615 may be performed according to the methods described herein. In certain examples, aspects of the operations of block 1615 may be performed by a receiver as described with reference to FIGS. 10 through 12.

Figure 17:
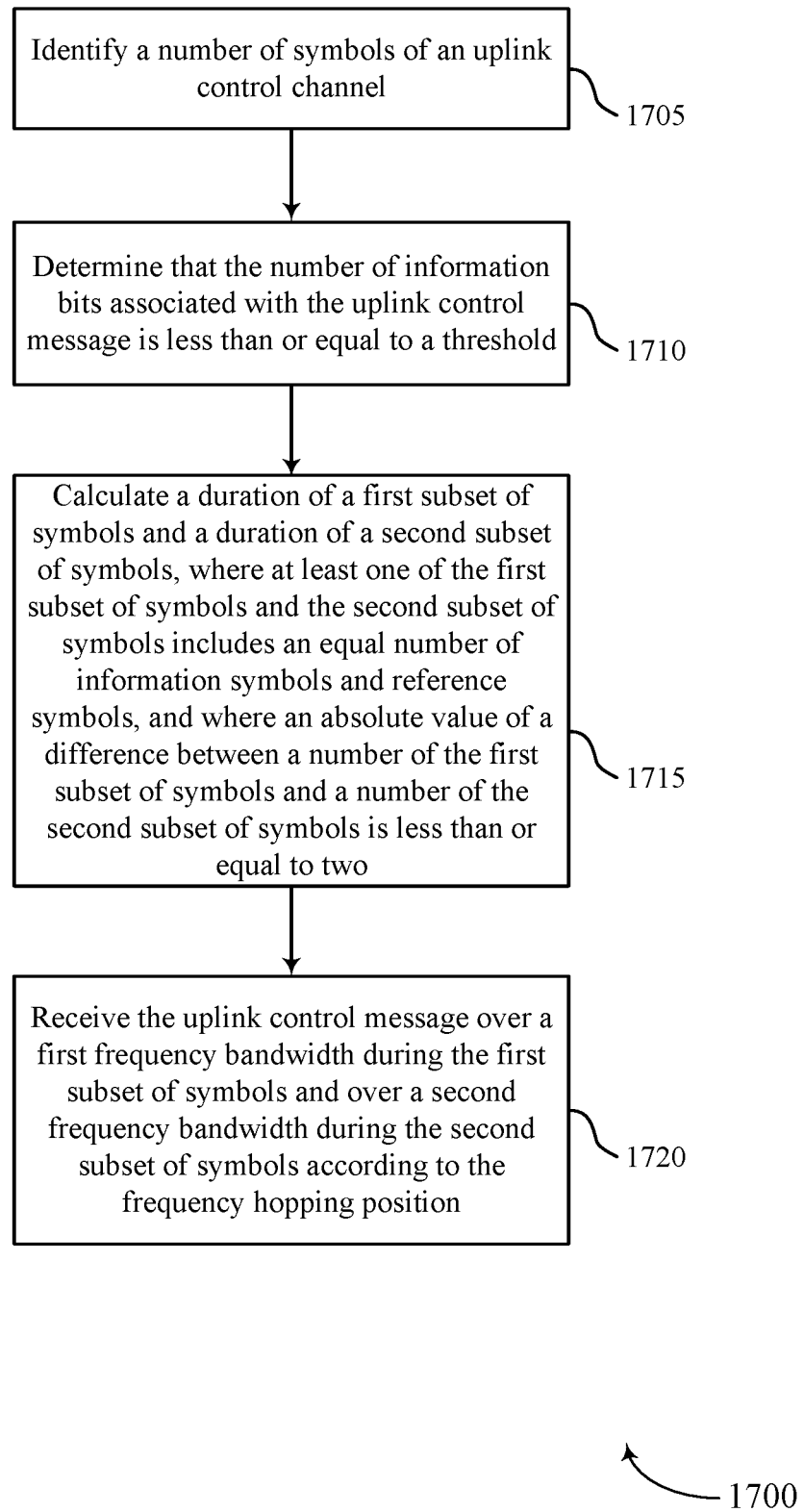

FIG. 17 shows a flowchart illustrating a method 1700 for frequency hopping in an uplink control channel in accordance with aspects of the present disclosure. The operations of method 1700 may be implemented by a base station 105 or its components as described herein. For example, the operations of method 1700 may be performed by a base station communications manager as described with reference to FIGS. 10 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify a number of symbols of an uplink control channel. The operations of block 1705 may be performed according to the methods described herein. In certain examples, aspects of the operations of block 1705 may be performed by a PUCCH manager as described with reference to FIGS. 10 through 12.

At block 1710 the base station 105 may determine that the number of information bits associated with the uplink control message is less than or equal to a threshold. The operations of block 1710 may be performed according to the methods described herein. In certain examples, aspects of the operations of block 1710 may be performed by a frequency hopping manager as described with reference to FIGS. 10 through 12. In some cases, the uplink control message comprises one or more information symbols and one or more reference symbols that alternate with one another in time. In some cases, a frequency hopping position is determined based at least in part on a relationship between information symbols and reference symbols in the uplink control message.

At block 1715 the base station 105 may calculate a duration of a first subset of symbols and a duration of a second subset of symbols, wherein at least one of the first subset of symbols and the second subset of symbols comprises an equal number of information symbols and reference symbols, and wherein an absolute value of a difference between a number of the first subset of symbols and a number of the second subset of symbols is less than or equal to two. The operations of block 1715 may be performed according to the methods described herein. In certain examples, aspects of the operations of block 1715 may be performed by a frequency hopping manager as described with reference to FIGS. 10 through 12.

At block 1720 the base station 105 may receive the uplink control message over a first frequency bandwidth during the first subset of symbols and over a second frequency bandwidth during the second subset of symbols according to the frequency hopping position. The operations of block 1720 may be performed according to the methods described herein. In certain examples, aspects of the operations of block 1720 may be performed by a receiver as described with reference to FIGS. 10 through 12.

Figure 18:
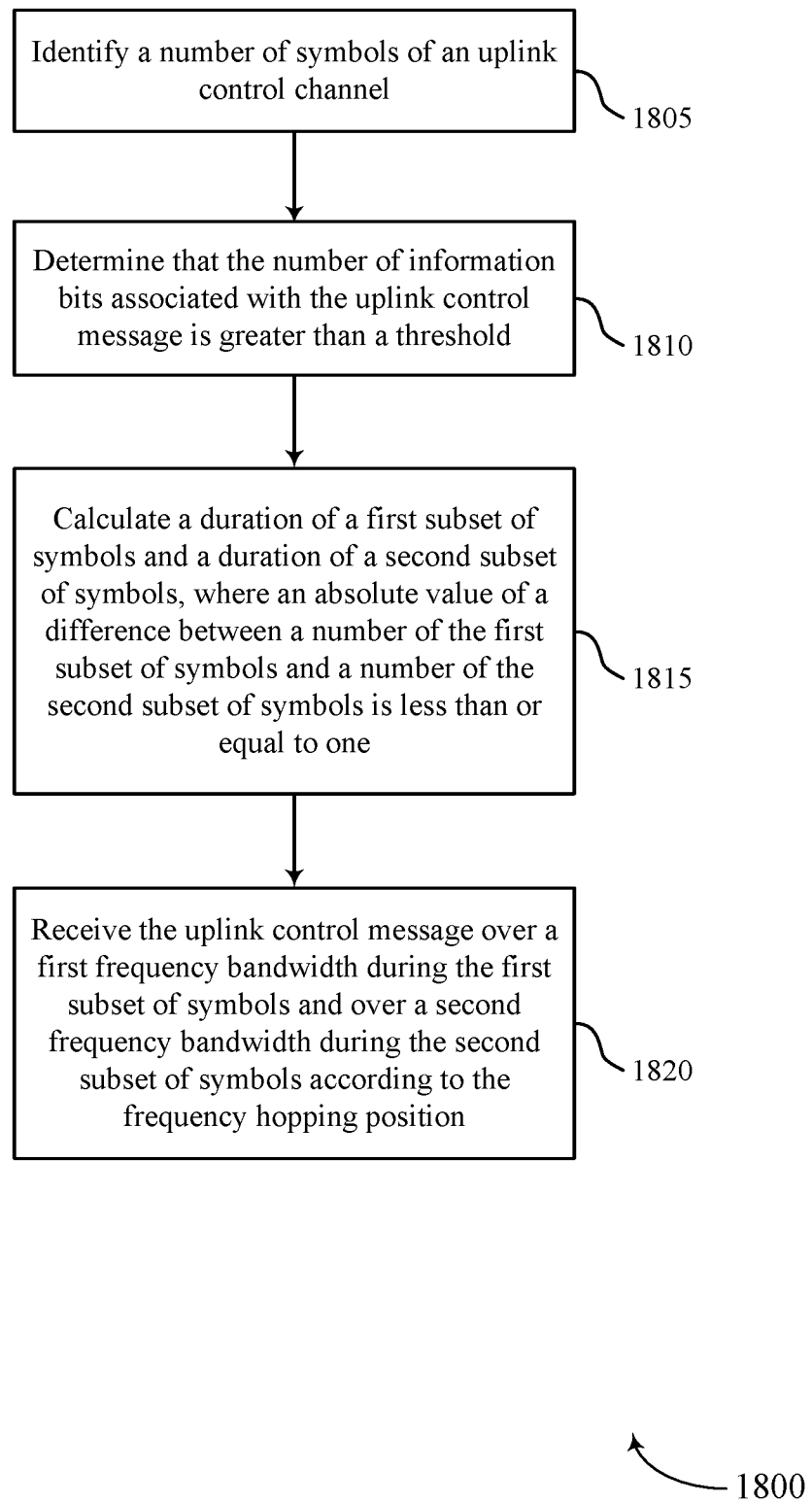

FIG. 18 shows a flowchart illustrating a method 1800 for frequency hopping in an uplink control channel in accordance with aspects of the present disclosure. The operations of method 1800 may be implemented by a base station 105 or its components as described herein. For example, the operations of method 1800 may be performed by a base station communications manager as described with reference to FIGS. 10 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify a number of symbols of an uplink control channel. The operations of block 1805 may be performed according to the methods described herein. In certain examples, aspects of the operations of block 1805 may be performed by a PUCCH manager as described with reference to FIGS. 10 through 12.

At block 1810 the base station 105 may determine that the number of information bits associated with the uplink control message is greater than a threshold. The operations of block 1810 may be performed according to the methods described herein. In certain examples, aspects of the operations of block 1810 may be performed by a frequency hopping manager as described with reference to FIGS. 10 through 12.

At block 1815 the base station 105 may calculate a duration of a first subset of symbols and a duration of a second subset of symbols, wherein an absolute value of a difference between a number of the first subset of symbols and a number of the second subset of symbols is less than or equal to one. The operations of block 1815 may be performed according to the methods described herein. In certain examples, aspects of the operations of block 1815 may be performed by a frequency hopping manager as described with reference to FIGS. 10 through 12.

At block 1820 the base station 105 may receive the uplink control message over a first frequency bandwidth during the first subset of symbols and over a second frequency bandwidth during the second subset of symbols according to the frequency hopping position. The operations of block 1820 may be performed according to the methods described herein. In certain examples, aspects of the operations of block 1820 may be performed by a receiver as described with reference to FIGS. 10 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a UE, comprising:
    generating uplink control information including a set of information bits for transmission in an uplink control message;
    receiving, from the base station, a message indicating a set of symbols within an uplink control channel for the transmission of the uplink control message;
    determining a frequency hopping position within the set of symbols for the transmission of the uplink control message based at least in part on a number of symbols in the set of symbols and a number of information bits in the set of information bits; and
    transmitting, to the base station, the uplink control message including the uplink control information over a first frequency bandwidth of the uplink control channel during a first subset of symbols of the set of symbols and over a second frequency bandwidth of the uplink control channel during a second subset of symbols of the set of symbols according to the frequency hopping position.

2. The method of claim 1, further comprising:
    determining that the number of information bits is less than or equal to a threshold.

3. The method of claim 2, further comprising:
    determining a duration of the first subset of symbols by taking a floor function of the number of symbols divided by two; and
    determining a duration of the second subset of symbols by subtracting the duration of the first subset of symbols from the number of symbols.

4. The method of claim 2, wherein the frequency hopping position is determined based at least in part on a relationship between information symbols and reference symbols in the uplink control message.

5. The method of claim 4, further comprising:
    determining that dividing the number of symbols by four yields an integer value;
    determining a duration of the first subset of symbols by multiplying the integer value by two; and
    determining a duration of the second subset of symbols by multiplying the integer value by two.

6. The method of claim 4, further comprising:
    determining that dividing the number of symbols by four yields an integer value and a remainder of one;
    determining a duration of the first subset of symbols by multiplying the integer value by two; and
    determining a duration of the second subset of symbols by multiplying the integer value by two and adding one.

7. The method of claim 4, further comprising:
    determining that dividing the number of symbols by four yields an integer value and a remainder of two;
    determining a duration of the first subset of symbols by multiplying the integer value by two; and
    determining a duration of the second subset of symbols by multiplying the integer value by two and adding two.

8. The method of claim 4, further comprising:
    determining that dividing the number of symbols by four yields an integer value and a remainder of three;
    determining a duration of the first subset of symbols by multiplying the integer value by two and adding one; and
    determining a duration of the second subset of symbols by multiplying the integer value by two and adding two.

9. The method of claim 4, wherein the uplink control message comprises one or more information symbols and one or more reference symbols that alternate with one another in time.

10. The method of claim 9, further comprising:
determining a duration of the first subset of symbols and a duration of the second subset of symbols, wherein at least one of the first subset of symbols and the second subset of symbols comprises an equal number of information symbols and reference symbols, and wherein an absolute value of a difference between a number of the first subset of symbols and a number of the second subset of symbols is less than or equal to two.

11. The method of claim 1, further comprising:
determining that the number of information bits is greater than a threshold.

12. The method of claim 11, further comprising:
determining a duration of the first subset of symbols by taking a floor function of the number of symbols divided by two; and
determining a duration of the second subset of symbols by subtracting the duration of the first subset of symbols from the number of symbols.

13. The method of claim 11, further comprising:
determining a duration of the first subset of symbols and a duration of the second subset of symbols, wherein an absolute value of a difference between a number of the first subset of symbols and a number of the second subset of symbols is less than or equal to one.

14. The method of claim 1, wherein the uplink control message comprises one or more information symbols and one or more reference symbols that alternate with one another in time.

15. The method of claim 1, further comprising:
receiving an uplink grant that allocates the number of symbols to the UE.

16. The method of claim 1, further comprising:
receiving an indication to use frequency hopping for transmissions over the uplink control channel.

17. The method of claim 1, further comprising:
identifying the number of information bits in the uplink control message based at least in part on a format of the uplink control channel.

18. The method of claim 1, wherein a duration of the first subset of symbols and a duration of the second subset of symbols are unequal.

19. A method for wireless communication at a base station, comprising:
determining a number of symbols in a set of symbols within an uplink control channel for the transmission, by a user equipment (UE), of an uplink control message;
determining a number of information bits in a set of information bits of uplink control information for transmission in the uplink control message;
determining a frequency hopping position within the set of symbols for the transmission of the uplink control message based at least in part on the number of symbols in the set of symbols and the number of information bits in the set of information bits;
transmitting, to the UE, a message indicating the set of symbols within the uplink control channel and the frequency hopping position; and
receiving, from the UE, the uplink control message including the uplink control information over a first frequency bandwidth of the uplink control channel during a first subset of symbols of the set of symbols and over a second frequency bandwidth of the uplink control channel during a second subset of symbols of the set of symbols according to the frequency hopping position.

20. The method of claim 19, further comprising:
determining that the number of information bits is less than or equal to a threshold.

21. The method of claim 20, further comprising:
determining a duration of the first subset of symbols by taking a floor function of the number of symbols divided by two; and
determining a duration of the second subset of symbols by subtracting the duration of the first subset of symbols from the number of symbols.

22. The method of claim 20, wherein the frequency hopping position is determined based at least in part on a relationship between information symbols and reference symbols in the uplink control message.

23. The method of claim 22, further comprising:
determining that dividing the number of symbols by four yields an integer value;
determining a duration of the first subset of symbols by multiplying the integer value by two; and
determining a duration of the second subset of symbols by multiplying the integer value by two.

24. The method of claim 22, further comprising:
determining that dividing the number of symbols by four yields an integer value and a remainder of one;
determining a duration of the first subset of symbols by multiplying the integer value by two; and
determining a duration of the second subset of symbols by multiplying the integer value by two and adding one.

25. The method of claim 22, further comprising:
determining that dividing the number of symbols by four yields an integer value and a remainder of two;
determining a duration of the first subset of symbols by multiplying the integer value by two; and
determining a duration of the second subset of symbols by multiplying the integer value by two and adding two.

26. The method of claim 22, further comprising:
determining that dividing the number of symbols by four yields an integer value and a remainder of three;
determining a duration of the first subset of symbols by multiplying the integer value by two and adding one; and
determining a duration of the second subset of symbols by multiplying the integer value by two and adding two.

27. The method of claim 22, wherein the uplink control message comprises one or more information symbols and one or more reference symbols that alternate with one another in time.

28. The method of claim 27, further comprising:
determining a duration of the first subset of symbols and a duration of the second subset of symbols, wherein at least one of the first subset of symbols and the second subset of symbols comprises an equal number of information symbols and reference symbols, and wherein an absolute value of a difference between a number of the first subset of symbols and a number of the second subset of symbols is less than or equal to two.

29. The method of claim 19, further comprising:
determining that the number of information bits is greater than a threshold.

30. The method of claim 29, further comprising:
determining a duration of the first subset of symbols by taking a floor function of the number of symbols divided by two; and determining a duration of the second subset of symbols by subtracting the duration of the first subset of symbols from the number of symbols.

31. The method of claim 29, further comprising:
determining a duration of the first subset of symbols and a duration of the second subset of symbols, wherein an absolute value of a difference between a number of the first subset of symbols and a number of the second subset of symbols is less than or equal to one.

32. The method of claim 19, wherein the uplink control message comprises one or more information symbols and one or more reference symbols that alternate with one another in time.

33. The method of claim 19, further comprising:
transmitting an uplink grant that indicates a format of the uplink control channel, wherein the format of the uplink control channel is associated with the number of information bits in the uplink control message.

34. The method of claim 19, further comprising:
transmitting an indication to use frequency hopping for transmissions over the uplink control channel.

35. The method of claim 19, wherein a duration of the first subset of symbols and a duration of the second subset of symbols are unequal.

36. An apparatus for wireless communication, comprising:
means for generating uplink control information including a set of information bits for transmission in an uplink control message;
means for receiving, from the base station, a message indicating a set of symbols within an uplink control channel for the transmission of the uplink control message;
means for determining a frequency hopping position within the set of symbols for the transmission of the uplink control message based at least in part on a number of symbols in the set of symbols and a number of information bits in the set of information bits; and
means for transmitting, to the base station, the uplink control message including the uplink control information over a first frequency bandwidth of the uplink control channel during a first subset of symbols of the set of symbols and over a second frequency bandwidth of the uplink control channel during a second subset of symbols of the set of symbols according to the frequency hopping position.

37. An apparatus for wireless communication, comprising:
means for determining a number of symbols in a set of symbols within an uplink control channel for the transmission, by a user equipment (UE), of an uplink control message;
means for determining a number of information bits in a set of information bits of uplink control information for transmission in the uplink control message;
means for determining a frequency hopping position within the set of symbols for the transmission of the uplink control message based at least in part on the number of symbols in the set of symbols and the number of information bits in the set of information bits;
means for transmitting, to the UE, a message indicating the set of symbols within the uplink control channel and the frequency hopping position; and
means for receiving, from the UE, the uplink control message including the uplink control information over a first frequency bandwidth of the uplink control channel during a first subset of symbols of the set of symbols and over a second frequency bandwidth of the uplink control channel during a second subset of symbols of the set of symbols according to the frequency hopping position.

38. An apparatus for wireless communication, comprising:
a processor;
memory in electronic communication with the processor; and
instructions stored in the memory and operable, when executed by the processor, to cause the apparatus to:
generate uplink control information including a set of information bits for transmission in an uplink control message;
receive, from the base station, a message indicating a set of symbols within an uplink control channel for the transmission of the uplink control message;
determine a frequency hopping position within the set of symbols for the transmission of the uplink control message based at least in part on a number of symbols in the set of symbols and a number of information bits in the set of information bits; and
transmit, to the base station, the uplink control message including the uplink control information over a first frequency bandwidth of the uplink control channel during a first subset of symbols of the set of symbols and over a second frequency bandwidth of the uplink control channel during a second subset of symbols of the set of symbols according to the frequency hopping position.

39. The apparatus of claim 38, wherein the instructions are further executable by the processor to:
determine that the number of information bits is less than or equal to a threshold.

40. The apparatus of claim 39, wherein the instructions are further executable by the processor to:
determine a duration of the first subset of symbols by taking a floor function of the number of symbols divided by two; and
determine a duration of the second subset of symbols by subtracting the duration of the first subset of symbols from the number of symbols.

41. The apparatus of claim 39, wherein the frequency hopping position is determined based at least in part on a relationship between information symbols and reference symbols in the uplink control message.

42. The apparatus of claim 41, wherein the instructions are further executable by the processor to:
determine that dividing the number of symbols by four yields an integer value;
determine a duration of the first subset of symbols by multiplying the integer value by two; and
determine a duration of the second subset of symbols by multiplying the integer value by two.

43. The apparatus of claim 41, wherein the instructions are further executable by the processor to:
determine that dividing the number of symbols by four yields an integer value and a remainder of one;
determine a duration of the first subset of symbols by multiplying the integer value by two; and
determine a duration of the second subset of symbols by multiplying the integer value by two and adding one.

44. The apparatus of claim 41, wherein the instructions are further executable by the processor to:
determine that dividing the number of symbols by four yields an integer value and a remainder of two;

determine a duration of the first subset of symbols by multiplying the integer value by two; and
determine a duration of the second subset of symbols by multiplying the integer value by two and adding two.

45. The apparatus of claim 41, wherein the instructions are further executable by the processor to:
determine that dividing the number of symbols by four yields an integer value and a remainder of three;
determine a duration of the first subset of symbols by multiplying the integer value by two and adding one; and
determine a duration of the second subset of symbols by multiplying the integer value by two and adding two.

46. The apparatus of claim 38, wherein the instructions are further executable by the processor to:
determine that the number of information bits is greater than a threshold.

47. The apparatus of claim 46, wherein the instructions are further executable by the processor to:
determine a duration of the first subset of symbols by taking a floor function of the number of symbols divided by two; and
determine a duration of the second subset of symbols by subtracting the duration of the first subset of symbols from the number of symbols.

48. The apparatus of claim 38, wherein a duration of the first subset of symbols and a duration of the second subset of symbols are unequal.

49. An apparatus for wireless communication, comprising:
a processor;
memory in electronic communication with the processor; and
instructions stored in the memory and operable, when executed by the processor, to cause the apparatus to:
determine a number of symbols in a set of symbols within an uplink control channel for the transmission, by a user equipment (UE), of an uplink control message;
determine a number of information bits in a set of information bits of uplink control information for transmission in the uplink control message;
determine a frequency hopping position within the set of symbols for the transmission of the uplink control message based at least in part on the number of symbols in the set of symbols and the number of information bits in the set of information bits;
transmit, to the UE, a message indicating the set of symbols within the uplink control channel and the frequency hopping position; and
receive, from the UE, the uplink control message including the uplink control information over a first frequency bandwidth of the uplink control channel during a first subset of symbols of the set of symbols and over a second frequency bandwidth of the uplink control channel during a second subset of symbols of the set of symbols according to the frequency hopping position.

50. The apparatus of claim 49, wherein the instructions are further executable by the processor to:
determine that the number of information bits is less than or equal to a threshold.

51. The apparatus of claim 50, wherein the instructions are further executable by the processor to:
determine a duration of the first subset of symbols by taking a floor function of the number of symbols divided by two; and
determine a duration of the second subset of symbols by subtracting the duration of the first subset of symbols from the number of symbols.

52. The apparatus of claim 50, wherein the frequency hopping position is determined based at least in part on a relationship between information symbols and reference symbols in the uplink control message.

53. The apparatus of claim 52, wherein the instructions are further executable by the processor to:
determine that dividing the number of symbols by four yields an integer value;
determine a duration of the first subset of symbols by multiplying the integer value by two; and
determine a duration of the second subset of symbols by multiplying the integer value by two.

54. The apparatus of claim 52, wherein the instructions are further executable by the processor to:
determine that dividing the number of symbols by four yields an integer value and a remainder of one;
determine a duration of the first subset of symbols by multiplying the integer value by two; and
determine a duration of the second subset of symbols by multiplying the integer value by two and adding one.

55. The apparatus of claim 52, wherein the instructions are further executable by the processor to:
determine that dividing the number of symbols by four yields an integer value and a remainder of two;
determine a duration of the first subset of symbols by multiplying the integer value by two; and
determine a duration of the second subset of symbols by multiplying the integer value by two and adding two.

56. The apparatus of claim 52, wherein the instructions are further executable by the processor to:
determine that dividing the number of symbols by four yields an integer value and a remainder of three;
determine a duration of the first subset of symbols by multiplying the integer value by two and adding one; and
determine a duration of the second subset of symbols by multiplying the integer value by two and adding two.

57. The apparatus of claim 49, wherein the instructions are further executable by the processor to:
determine that the number of information bits is greater than a threshold.

58. The apparatus of claim 57, wherein the instructions are further executable by the processor to:
determine a duration of the first subset of symbols by taking a floor function of the number of symbols divided by two; and
determine a duration of the second subset of symbols by subtracting the duration of the first subset of symbols from the number of symbols.

59. The apparatus of claim 49, wherein a duration of the first subset of symbols and a duration of the second subset of symbols are unequal.

60. A non-transitory computer readable medium storing code for wireless communication, the code comprising instructions executable by a processor to:
generate uplink control information including a set of information bits for transmission in an uplink control message;
receive, from the base station, a message indicating a set of symbols within an uplink control channel for the transmission of the uplink control message;
determine a frequency hopping position within the set of symbols for the transmission of the uplink control message based at least in part on a number of symbols in the set of symbols and a number of information bits in the set of information bits; and transmit, to the base station, the uplink control message including the uplink control information over a first frequency bandwidth of the uplink control channel during a first subset of symbols of the set of symbols and over a second frequency bandwidth of the uplink control channel during a second subset of symbols of the set of symbols according to the frequency hopping position.

61. A non-transitory computer readable medium storing code for wireless communication, the code comprising instructions executable by a processor to:

determine a number of symbols in a set of symbols within an uplink control channel for the transmission, by a user equipment (UE), of an uplink control message;

determine a number of information bits in a set of information bits of uplink control information for transmission in the uplink control message;

determine a frequency hopping position within the set of symbols for the transmission of the uplink control message based at least in part on the number of symbols in the set of symbols and the number of information bits in the set of information bits;

transmit, to the UE, a message indicating the set of symbols within the uplink control channel and the frequency hopping position; and receive, from the UE, the uplink control message including the uplink control information over a first frequency bandwidth of the uplink control channel during a first subset of symbols of the set of symbols and over a second frequency bandwidth of the uplink control channel during a second subset of symbols of the set of symbols according to the frequency hopping position.

* * * * *